United States Patent
Kim et al.

(10) Patent No.: US 11,532,310 B2
(45) Date of Patent: Dec. 20, 2022

(54) SYSTEM AND METHOD FOR RECOGNIZING USER'S SPEECH

(71) Applicant: Samsung Electronics Co., Ltd., Suwon-si (KR)

(72) Inventors: Chanwoo Kim, Suwon-si (KR); Dhananjaya N. Gowda, Suwon-si (KR); Kwangyoun Kim, Suwon-si (KR); Kyungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 16/988,929

(22) Filed: Aug. 10, 2020

(65) Prior Publication Data

US 2021/0050016 A1 Feb. 18, 2021

Related U.S. Application Data

(60) Provisional application No. 62/886,027, filed on Aug. 13, 2019.

(30) Foreign Application Priority Data

Nov. 14, 2019 (KR) ........................ 10-2019-0146177

(51) Int. Cl.
*G10L 15/00* (2013.01)
*G10L 15/30* (2013.01)
(Continued)

(52) U.S. Cl.
CPC .............. *G10L 15/30* (2013.01); *G10L 15/22* (2013.01); *G10L 19/008* (2013.01); *G10L 19/09* (2013.01); *G10L 15/08* (2013.01)

(58) Field of Classification Search
CPC combination set(s) only.
See application file for complete search history.

(56) References Cited

U.S. PATENT DOCUMENTS

| 7,933,777 B2 | 4/2011 | Koll |
| 8,249,877 B2 | 8/2012 | Koll |

(Continued)

FOREIGN PATENT DOCUMENTS

| JP | 2000-348141 | 12/2000 |
| JP | 4012143 | 9/2007 |

(Continued)

OTHER PUBLICATIONS

European Search Report and Written Opinion dated Feb. 5, 2021 in corresponding European Application No. 20190406.7.

(Continued)

*Primary Examiner* — Vu B Hang
(74) *Attorney, Agent, or Firm* — Nixon & Vanderhye, P.C.

(57) ABSTRACT

Provided is a system and method for recognizing a user's speech. A method, performed by a server, of providing a text string for a speech signal input to a device includes: receiving, from the device, an encoder output value derived from an encoder of an end-to-end automatic speech recognition (ASR) model included in the device; identifying a domain corresponding to the received encoder output value; selecting a decoder corresponding to the identified domain from among a plurality of decoders of an end-to-end ASR model included in the server; obtaining a text string from the received encoder output value using the selected decoder; and providing the obtained text string to the device.

20 Claims, 19 Drawing Sheets

(51) Int. Cl.
*G10L 19/09* (2013.01)
*G10L 19/008* (2013.01)
*G10L 15/22* (2006.01)
*G10L 15/08* (2006.01)

(56) References Cited

U.S. PATENT DOCUMENTS

| | | |
|---|---|---|
| 9,131,369 B2 | 9/2015 | Ganong, III et al. |
| 9,171,541 B2 | 10/2015 | Kennewick et al. |
| 9,263,036 B1 | 2/2016 | Graves |
| 9,305,554 B2 | 4/2016 | Jagatheesan et al. |
| 9,430,465 B2 | 8/2016 | Waibel et al. |
| 9,520,126 B2 | 12/2016 | Kim et al. |
| 9,620,122 B2 | 4/2017 | Vanblon |
| 9,674,328 B2 | 6/2017 | Juneja |
| 9,886,952 B2 | 2/2018 | Choi et al. |
| 10,032,451 B1 | 7/2018 | Mamkina et al. |
| 10,127,908 B1 | 11/2018 | Deller et al. |
| 10,366,692 B1 | 7/2019 | Adams et al. |
| 10,460,726 B2 | 10/2019 | Lee |
| 2005/0131686 A1 | 6/2005 | Yamamoto et al. |
| 2005/0182628 A1 | 8/2005 | Choi |
| 2010/0131277 A1 | 5/2010 | Nakano |
| 2013/0151250 A1 | 6/2013 | VanBlon |
| 2014/0012575 A1 | 1/2014 | Ganong, III et al. |
| 2015/0149167 A1 | 5/2015 | Beaufays et al. |
| 2017/0148431 A1 | 5/2017 | Catanzaro et al. |
| 2017/0256254 A1 | 9/2017 | Huang et al. |
| 2018/0174589 A1 | 6/2018 | Choi et al. |
| 2019/0057683 A1 | 2/2019 | Sak et al. |
| 2019/0180740 A1 | 6/2019 | Nandy et al. |
| 2019/0189115 A1 | 6/2019 | Hori et al. |
| 2019/0189124 A1 | 6/2019 | Tsunoo et al. |
| 2019/0244604 A1 | 8/2019 | Masataki et al. |

FOREIGN PATENT DOCUMENTS

| | | |
|---|---|---|
| JP | 2015-075706 | 4/2015 |
| JP | 2019-120841 | 7/2019 |
| KR | 10-2003-0012064 | 2/2003 |
| KR | 10-2012-0110751 | 10/2012 |
| KR | 10-2015-0087687 | 7/2015 |
| KR | 10-1786533 | 10/2017 |
| KR | 10-2018-0001889 | 1/2018 |

OTHER PUBLICATIONS

International Search Report and Written Opinion dated Nov. 11, 2020 in corresponding International Application No. PCT/KR2020/010494.

International Search Report and Written Opinion dated Nov. 13, 2020 in corresponding International Application No. PCT/KR2020/010565.

International Search Report and Written Opinion dated Nov. 27, 2020 in corresponding International Application No. PCT/KR2020/010567.

Hoon Kim, "Voice recognition method and kakaoi's voice engine", brunch, Aug. 31, 2017, pp. 1-6, retrieved from the Internet:<URL: https://brunch.co.kr/@kakao-it/105>.

Jinxi Guo, et al., "A Spelling Correction Model for End-to-End Speech Recognition", arXiv:1902.07178 [eess.AS], Feb. 19, 2019, 5 pages.

Extended Search Report dated Apr. 12, 2022 issued in European Patent Application No. 20851479.4.

Hannun, Awni et al., "Deep Speech: Scaling up end-to-end speech recognition," Dec. 19, 2014, XP055453713, pp. 1-12.

Extended European Search Report dated Jul. 7, 2022 in EP Application No. 20852027.0.

European Office Action dated Oct. 11, 2022 for EP Application No. 20190406.7.

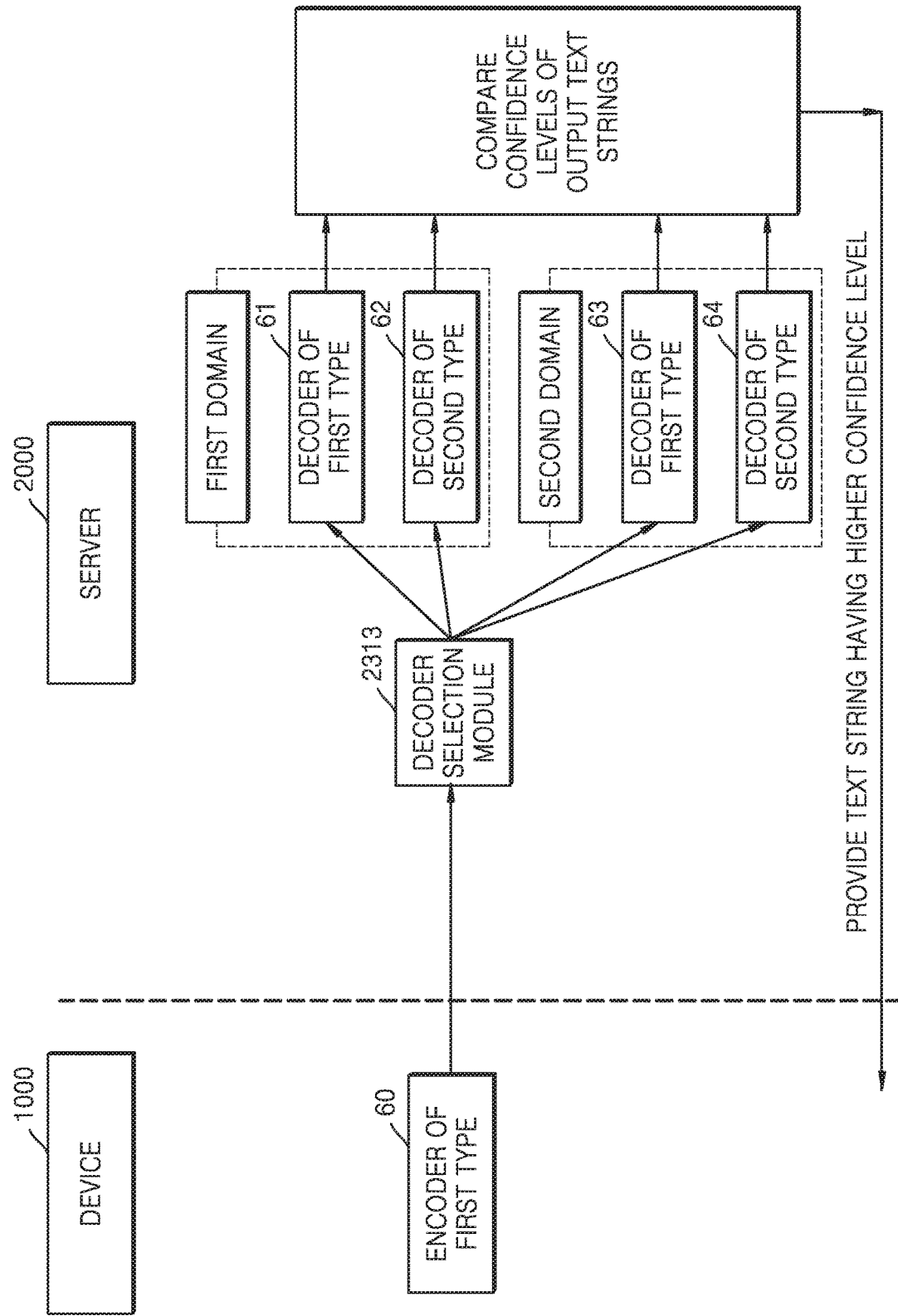

FIG. 8A
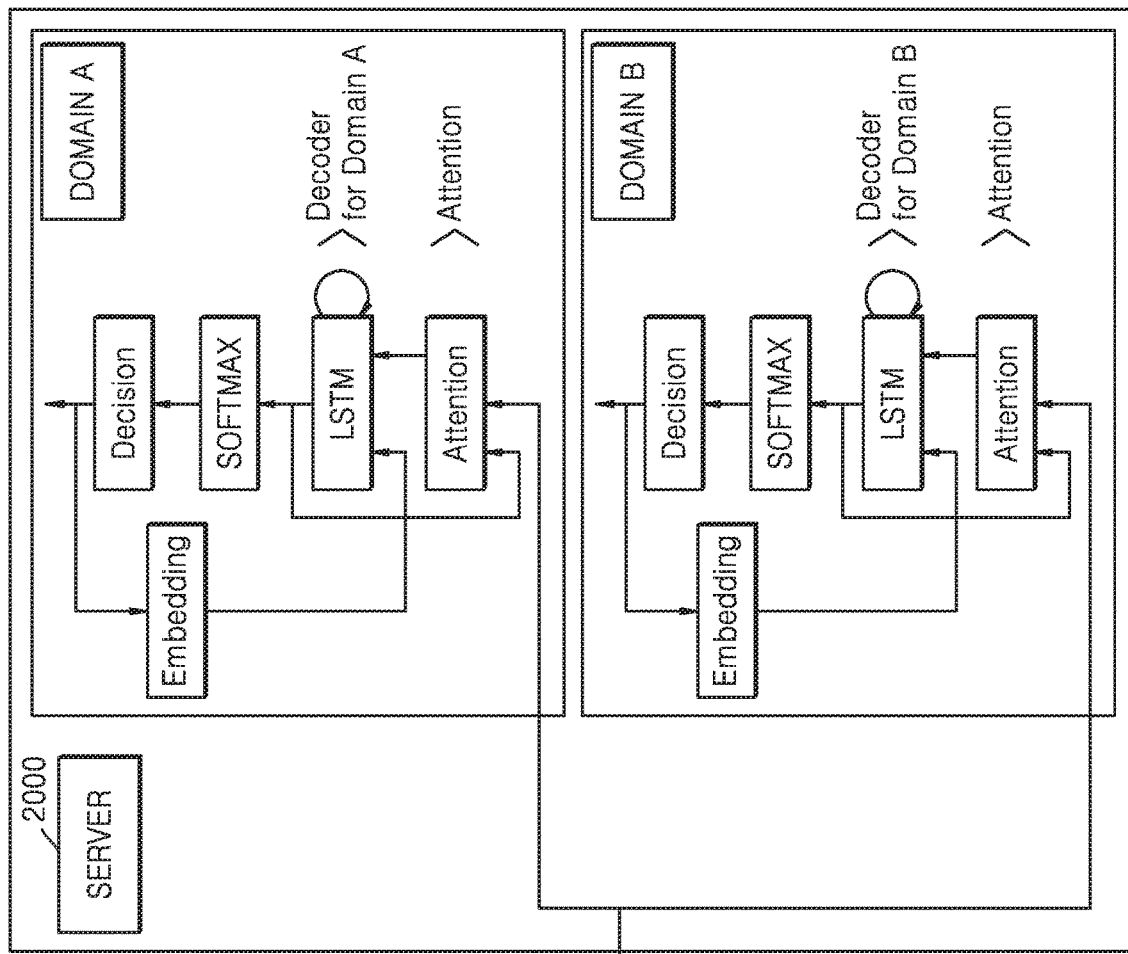
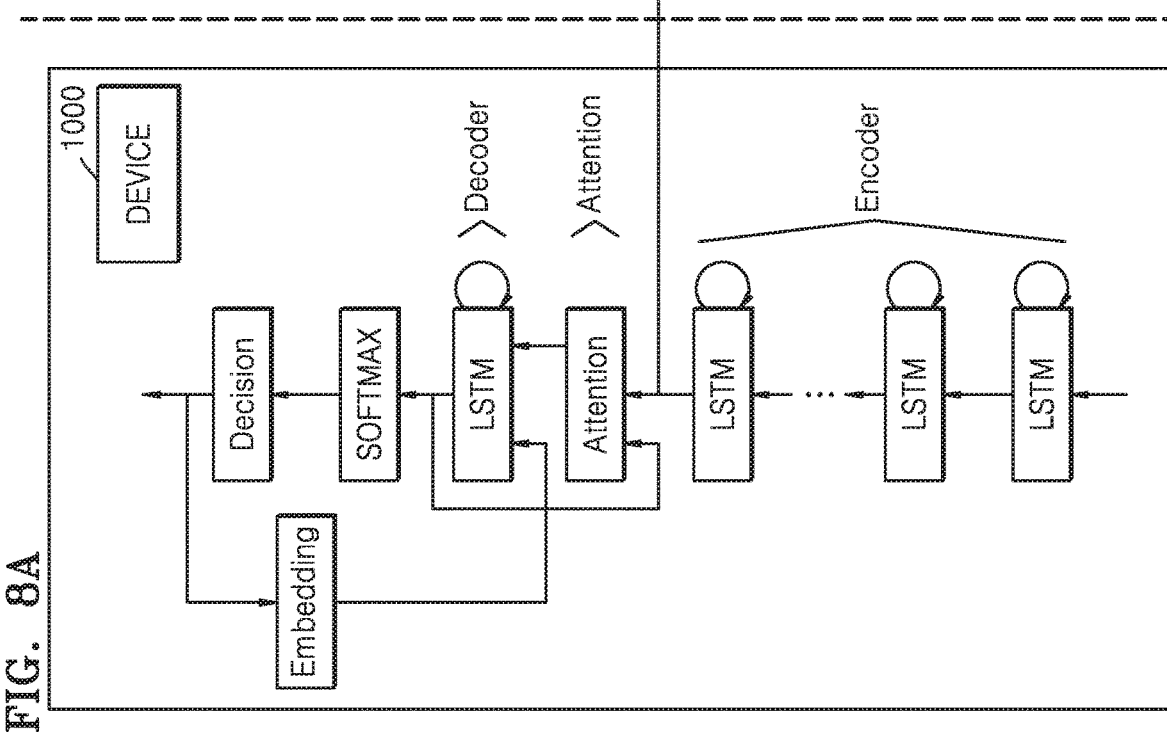

SYSTEM AND METHOD FOR RECOGNIZING USER'S SPEECH

CROSS-REFERENCE TO RELATED APPLICATIONS

This application is based on and claims priority under 35 U.S.C. § 119 to U.S. Provisional Patent Application No. 62/886,027, filed on Aug. 13, 2019, in the United States Patent and Trademark Office, and Korean Patent Application No. 10-2019-0146177, filed on Nov. 14, 2019, in the Korean Intellectual Property Office, the disclosures of which are incorporated by reference herein in their entireties.

BACKGROUND

1. Field

The disclosure relates to a system and method for recognizing a user's speech, and for example, to a system and method by which a device and a server interwork together to recognize a user's speech.

2. Description of Related Art

Automatic speech recognition (ASR) may refer, for example, to a technology for receiving and recognizing a human speech and converting it into text. ASR is used in various electronic devices such as smart phones, air conditioners, refrigerators, artificial intelligence (AI) speakers, etc. First, a device receives a human speech as input, and recognizes the input speech and converts it into text using a pre-trained speech recognition model in the device. The text is provided as a final output. Recently, deep neural network (DNN) algorithms have been used in various fields of machine learning and have achieved improved performance over time. In the field of speech recognition, the performance has been greatly improved due to use of neural networks, and research has been recently conducted on an end-to-end ASR model for speech recognition.

SUMMARY

Embodiments of the disclosure provide a system and method for recognizing a user's speech by providing a server with an output value of an encoder of an end-to-end automatic speech recognition (ASR) model in a device.

Embodiments of the disclosure also provide are a system and method for recognizing a user's speech using a decoder corresponding to a domain related to an output value of an encoder of an end-to-end ASR model in a device.

Embodiments of the disclosure also provide a system and method capable of more accurately recognizing a user's speech by performing encoding for an end-to-end ASR model at a device while performing decoding for an end-to-end ASR model at a server.

Additional aspects will be set forth in part in the description which follows and, in part, will be apparent from the description.

According to an example embodiment of the disclosure, a method, performed by a server, of providing a text string for a speech signal input to a device includes: receiving, from the device, an encoder output value derived from an encoder of an end-to-end automatic speech recognition (ASR) model in the device; identifying a domain corresponding to the received encoder output value; selecting a decoder corresponding to the identified domain from among a plurality of decoders of an end-to-end ASR model included in the server; obtaining a text string from the received encoder output value using the selected decoder; and providing the obtained text string to the device, wherein the encoder output value is derived by the device by encoding the speech signal input to the device.

According to another example embodiment of the disclosure, a server for providing a text string for a speech signal input to a device includes: a communication interface comprising communication circuitry; a storage storing a program including one or more instructions; and a processor configured to execute the one or more instructions of the program stored in the storage to: receive, from the device, an encoder output value derived from an encoder of an end-to-end automatic speech recognition (ASR) model in the device; identify a domain corresponding to the received encoder output value; select a decoder corresponding to the identified domain from among a plurality of decoders of an end-to-end ASR model included in the server; obtain a text string from the received encoder output value using the selected decoder; and provide the obtained text string to the device, wherein the encoder output value is derived by the device by encoding the speech signal input to the device.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6C is a diagram illustrating an example in which a server selects a plurality of decoders corresponding to a plurality of domains to process an encoder output value, according to an embodiment of the disclosure;

FIG. 8A is a diagram illustrating an example in which a device and a server obtain a text string from a speech signal based on encoders of attention-based ASR models not being included in the server, according to an embodiment of the disclosure;

DETAILED DESCRIPTION

Figure 1:
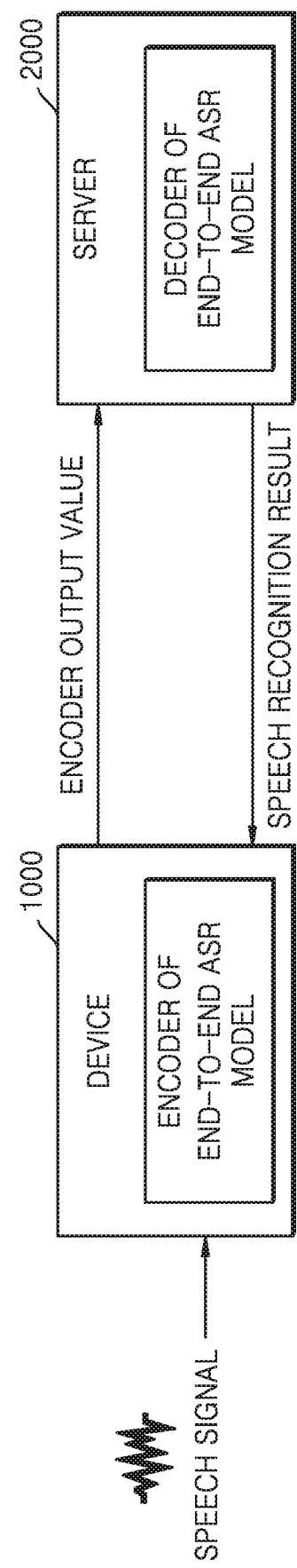
FIG. 1 is a diagram illustrating an example automatic speech recognition system according to an embodiment of the disclosure.

Embodiments of the disclosure will now be described in greater detail hereinafter with reference to the accompanying drawings. However, example embodiments of the disclosure may have different forms and should not be construed as being limited to the embodiments set forth herein. In addition, parts not related to the disclosure may be omitted to clarify the description of the embodiments of the disclosure, and like reference numerals in the drawings denote like elements throughout.

Throughout the disclosure, the expression "at least one of a, b or c" indicates only a, only b, only c, both a and b, both a and c, both b and c, all of a, b, and c, or variations thereof.

Throughout the disclosure, it will be understood that when an element is referred to as being "connected" or "coupled" to another element, it can be directly connected to or electrically coupled to the other element with one or more intervening elements interposed therebetween. When a part "includes" or "comprises" an element, unless there is a particular description contrary thereto, the part can further include other elements, not excluding the other elements.

Hereinafter, various example embodiments of the disclosure will be described in greater detail with reference to the accompanying drawings.

FIG. 1 is a diagram illustrating an example speech recognition system according to an embodiment of the disclosure.

Referring to FIG. 1, according to an embodiment of the disclosure, the speech recognition system includes a device 1000 and a server 2000.

The device 1000 may include an encoder of an end-to-end automatic speech recognition (ASR) model, and the server 2000 may include a decoder of an end-to-end ASR model. The device 1000 may perform an operation of encoding a user's speech input using the encoder of the end-to-end ASR model in order to recognize the user's speech input, and the server 2000 may perform an operation of decoding the user's speech input encoded by the device 1000 using the decoder of the end-to-end ASR model. In such a manner, an ASR model may be performed.

The end-to-end ASR model may refer, for example, to a speech recognition model that recognizes a text string from speech using an integrated neural network, and may have a structure including an integrated neural network without separately using an acoustic model, a pronunciation dictionary, and a language model. Using the integrated neural network, the end-to-end ASR model may convert speech into text without having to perform a process of recognizing phonemes in the speech and converting the recognized phonemes into text. The end-to-end ASR model may, for example, have a structure with a recurrent neural network (RNN) and include an encoder for encoding speech input and a decoder for estimating a text string from an encoder output value.

The device 1000 may receive the user's speech input, encode the received user's speech input using the encoder of the end-to-end ASR model, and provide an encoder output value to the server 2000. Furthermore, the server 2000 may receive the encoder output value from the device 1000 and decode the received encoder output value using the decoder of the end-to-end ASR model. The server 2000 may obtain a speech recognition result by decoding the encoder output value and provide the obtained speech recognition result to the device 1000.

Examples of the device 1000 may include, but are not limited to, a smartphone, a tablet PC, a PC, a smart TV, a mobile phone, a personal digital assistant (PDA), a laptop, a media player, a micro server, a global positioning system (GPS), an electronic book terminal, a digital broadcasting terminal, a navigation device, a kiosk, an MP3 player, a digital camera, and other mobile or non-mobile computing devices, or the like. In addition, the device 1000 may be a wearable device such as a watch, glasses, a hair band, and a ring, having a communication function and a data processing function, or the like. However, embodiments of the disclosure are not limited thereto, and the device 1000 may include any apparatus capable of exchanging data with the server 2000 via a network.

The network may include, for example, and without limitation, a local area network (LAN), a wide area network (WAN), a value added network (VAN), a mobile radio communication network, a satellite communication network, or the like, or any combination thereof. Furthermore, the network may include a data communication network, in a comprehensive sense, configured to enable smooth communication across network entities shown in FIG. 1 and includes, for example, and without limitation, a wired Internet, a wireless Internet, a mobile wireless communication network, or the like.

Figure 2:
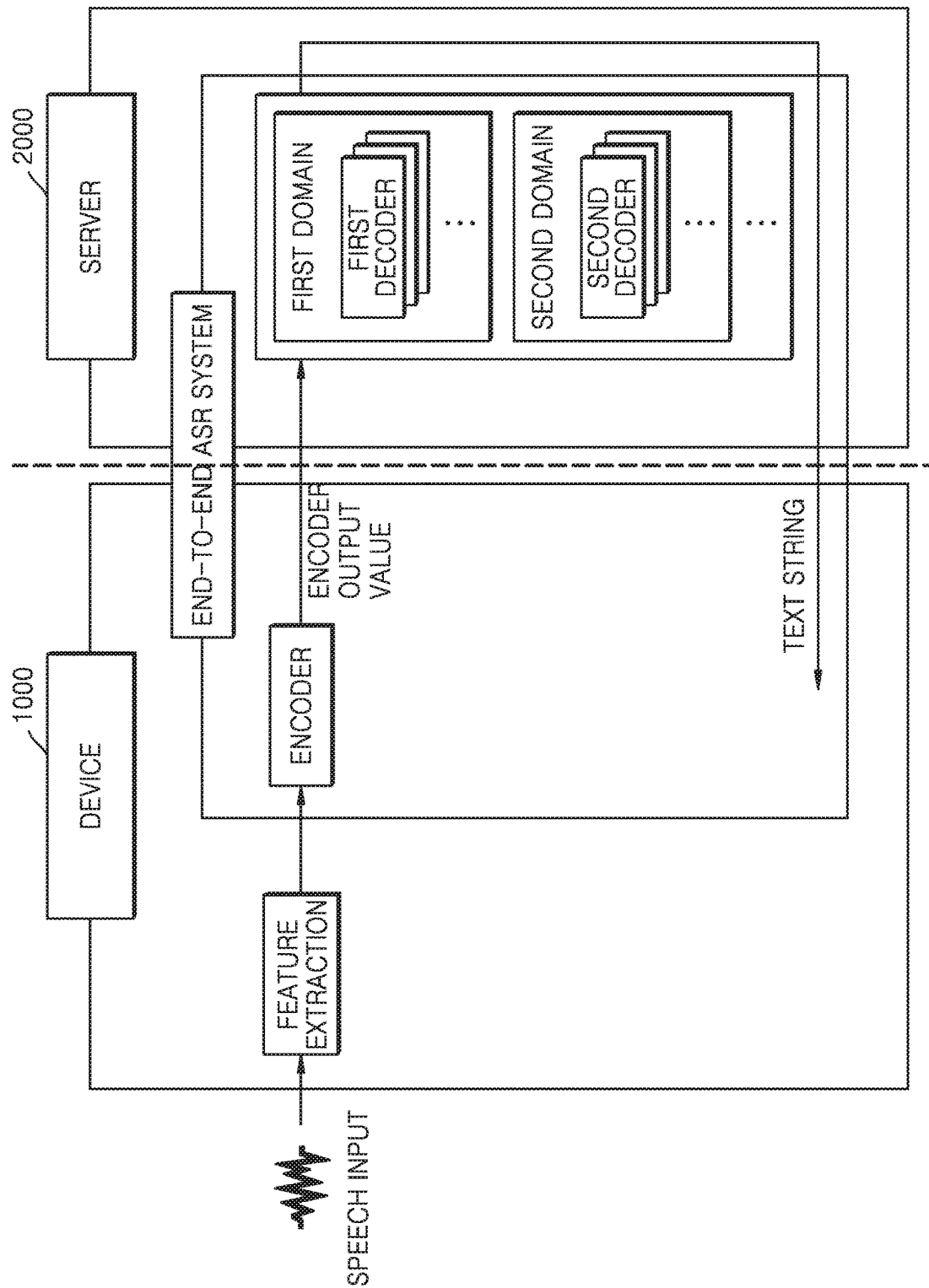
FIG. 2 is a diagram illustrating an example speech recognition system including decoders associated with a plurality of domains, according to an embodiment of the disclosure.

FIG. 2 is a diagram illustrating an example speech recognition system including decoders associated with a plurality of domains, according to an embodiment of the disclosure.

Referring to FIG. 2, the device 1000 may include an encoder of an end-to-end ASR system, and the server 2000 may include decoders of the end-to-end ASR system. For example, the server 2000 may include a plurality of first decoders corresponding to a first domain and a plurality of second decoders corresponding to a second domain.

The device 1000 may extract features from a speech input to obtain a feature vector and then input the obtained feature vector to the encoder of the end-to-end ASR system. The device 1000 may provide an encoder output value to the server 2000. The encoder output value may, for example, be in the form of a sequence, e.g., a hidden layer vector sequence that is an output value of a neural network layer in the encoder.

The server 2000 may receive an encoder output value from the device 1000 and select a domain related to the encoder output value based on the encoder output value. The domain may, for example, represent a field related to an input speech and may be preset according to the semantic meaning, attributes, etc. of the input speech. For example, the domain may be classified according to a service related to the input speech. Furthermore, an end-to-end ASR model may be trained for each domain, and in this case, the end-to-end ASR model trained for each domain may include, for example, a model trained using an input speech related to the domain and its corresponding text as the correct answer. The server 2000 may select at least one of a plurality of preset domains and then at least one of decoders corresponding to the selected domain. The server 2000 may select a decoder corresponding to the encoder in the device 1000. Furthermore, the server 2000 may obtain a decoder output value by inputting the encoder output value to the selected decoder. The server 2000 may obtain a text string that is a result of recognizing the speech input using a decoder output value and provide the obtained text string to the device 1000.

Figure 3:
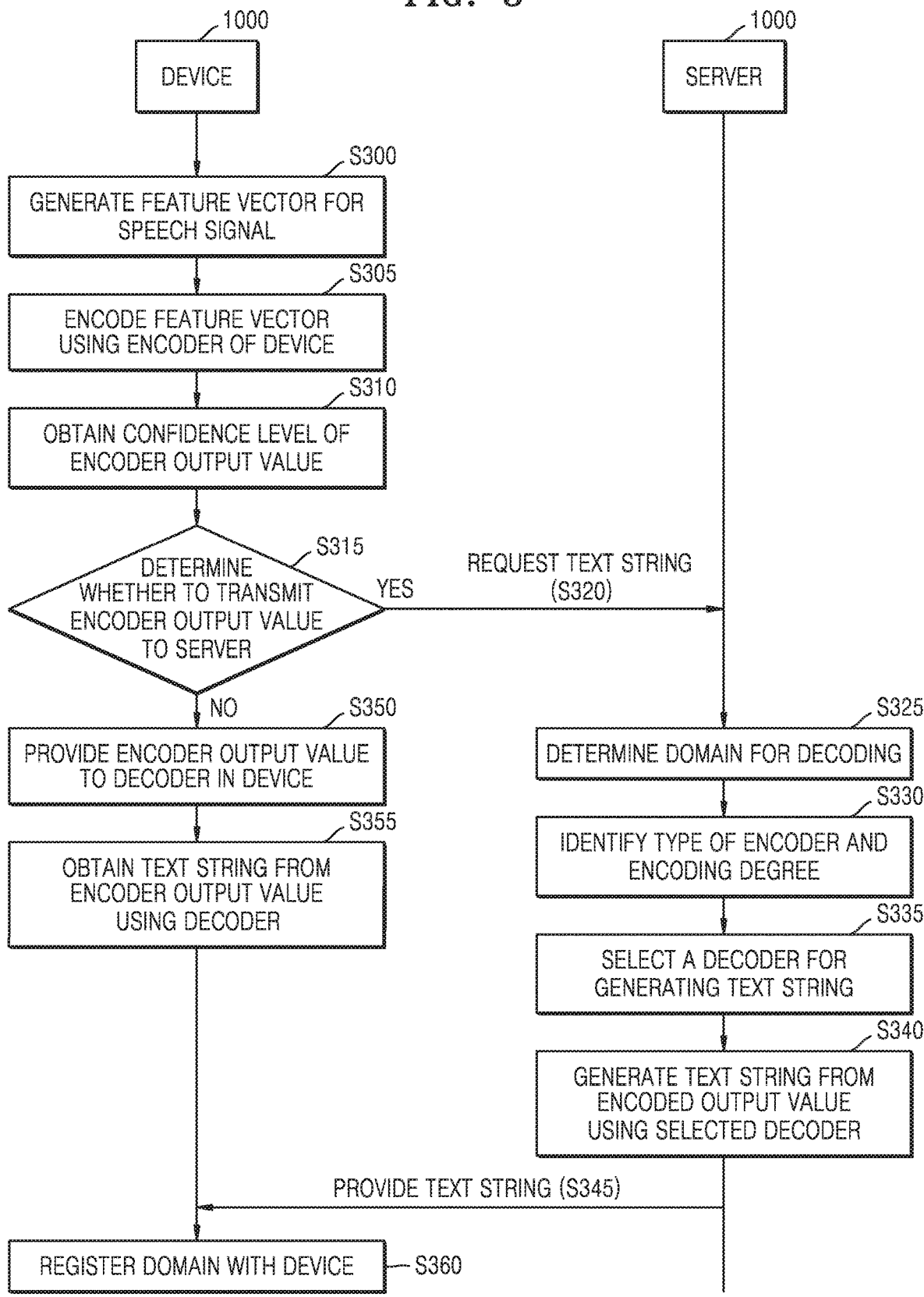
FIG. 3 is a flowchart illustrating an example method, performed by a device and a server in a speech recognition system, of recognizing a speech input and obtaining a text string, according to an embodiment of the disclosure.

FIG. 3 is a flowchart illustrating an example method, performed by the device 1000 and the server 2000 in a speech recognition system, of recognizing a speech input and obtaining a text string, according to an embodiment of the disclosure.

The device 1000 may perform various example operations illustrated in FIG. 3 by executing instructions stored in a memory of the device 1000. For example, the device 1000 may perform its operations illustrated in FIG. 3 by executing at least one of a speech recognition evaluation module 1430, a natural language understanding (NLU) determination module 1440, a domain identification module 1450, a domain registration module 1460, an ASR model 1410, an NLU model 1420, or the like, as described below with reference to FIG. 14. However, embodiments of the disclosure are not limited thereto, and the device 1000 may execute other programs stored in the memory in order to perform certain operations.

Furthermore, the server 2000 may perform its operations illustrated in FIG. 3 by executing instructions stored in a storage of the server 2000. For example, the server 2000 may perform its operations illustrated in FIG. 3 by executing at least one of a speech recognition management module 2310, an ASR module 2320, an NLU module 2330, or a speech interpretation management module 2340, as described below with reference to FIG. 13. However, embodiments of the disclosure are not limited thereto, and the server 2000 may execute other programs stored in the memory in order to perform certain operations.

The device 1000 may generate a feature vector for a speech signal (operation S300). The device 1000 may receive a user's speech input (e.g., a user utterance) via a microphone and generate a feature vector representing features of a speech signal obtained via the microphone based on the speech signal. When noise is included in the speech signal, the device 1000 may remove noise from the speech signal and obtain a feature vector based on the speech signal from which the noise has been removed.

The device 1000 may encode the feature vector using an encoder (operation S305). The device 1000 may input a feature vector to an encoder of an end-to-end ASR model in the device 1000 to recognize a user's speech. In this case, the device 1000 may convert the feature vector into a format suitable for the encoder of the end-to-end ASR model. For example, the device 1000 may encode the feature vector using an encoder 1411 in the ASR model 1410 of FIG. 14.

The device 1000 may obtain a confidence level of an encoder output value (operation S310). An encoder of an end-to-end ASR model in the device 1000 may include a plurality of layers, e.g., a plurality of stacked long short-term memory (LSTM) layers. Furthermore, the encoded output value may be one of output values obtained from a plurality of layers in the encoder. The encoder output value may be a hidden vector output from a layer in the encoder. The confidence level of the encoded output value may include, for example, a numerical value indicating a degree of matching between the encoded output value and input speech, and the confidence level may include, for example, a confidence score, but is not limited thereto. The confidence level of the encoded output value may indicate a degree of matching between text represented by the encoded output value and the input speech. For example, when an encoder of an ASR model in the device 1000 is trained, a connectionist temporal classification (CTC) loss function may be used. In this case, by connecting a projection layer to an output terminal of the encoder, text may be obtained from the projection layer. Furthermore, the device 1000 may calculate a confidence level of an encoder output value based on the text obtained from the projection layer connected to the output terminal of the encoder. However, a method of calculating a confidence level is not limited thereto, and for example, the device 1000 may calculate a confidence level directly from an encoder output value using a preset algorithm. As another example, the device 1000 may obtain a confidence level of an encoder output value using the speech recognition evaluation module (e.g., 1430 of FIG. 14).

The device 1000 may determine whether to transmit the encoder output value to the server 2000 (operation S315). The device 1000 may determine whether to transmit the encoder output value to the server 2000 by comparing the confidence level of the encoder output value with a preset threshold. When the confidence level of the encoder output value is greater than or equal to the preset threshold, the device 1000 may determine to transmit the encoder output value to the server 2000. On the other hand, when the confidence level of the encoder output value is less than the preset threshold, the device 1000 may determine not to transmit the encoder output value to the server 2000.

Although it has been described in operation S315 that the device 1000 determines whether to transmit the encoder output value to the server 2000 based on the confidence level of the encoder output value, embodiments of the disclosure are not limited thereto. The device 1000 may determine whether to use an output value of an ASR model in the device 1000 based on the output value of the ASR model. In this case, the device 1000 may determine whether to transmit an encoder output value to the server 2000 based on a confidence level of the output value of the ASR model. The output value of the ASR model in the device 1000 may be at least one text string obtained when decoding an encoder output value from an encoder of the ASR model in the device 1000 using a decoder of the ASR model in the device 1000. Furthermore, a confidence level of the output value of the ASR model may be a numerical value indicating the degree of matching a text string output from the ASR model to an input speech. In addition, for example, a confidence score may be calculated for each text string output from the ASR model, the confidence score indicating the degree of matching the text string to an input speech.

When it is determined in operation S315 that the encoder output value is to be transmitted to the server 2000 ("Yes" in operation S315), the device 1000 may request a text string from the server 2000 (operation S320).

The device 1000 may request a text string from the server 2000 while transmitting the encoder output value to the server 2000. In this case, the device 1000 may transmit, to the server 2000, an output value obtained from a last layer among a plurality of layers in the encoder. The device 1000 may transmit, to the server 2000, an output value selected from among output values obtained from a plurality of layers in the encoder.

Furthermore, the device 1000 may provide encoding information regarding the encoder in the device 1000 to the server 2000 while requesting a text string from the server 2000. Encoding information may include, for example, information related to an encoder output value, and may include, for example, but is not limited to, a type of an end-to-end ASR model in the device 1000, an identification value of the end-to-end ASR model, an identification value of an encoder in the end-to-end ASR model, a type of the encoder, properties of the encoder, and information indicating a degree of encoding, but is not limited thereto. Furthermore, the information indicating the degree of encoding may include, for example, information for identifying a layer that outputs the encoder output value.

Furthermore, the device 1000 may provide domain information related to the encoder output value to the server 2000 while requesting a text string from the server 2000. The domain information may include, for example, information for identifying a domain and may include, for example, a domain name and a domain identifier, but is not limited thereto. The device 1000 may identify a domain related to the encoder output value using the domain identification module (e.g., 1450 of FIG. 14) in the device 1000. For example, the device 1000 may identify a domain related to the encoder output value in text obtained from a projection layer connected to an output terminal of the encoder. The projection layer may be a layer that outputs text by taking as input a hidden vector value output from the encoder. In this case, the device 1000 may identify a domain related to the encoder output value based on a domain confidence level for the text generated from the encoder output value. A domain confidence level may include, for example, a numerical value indicating how closely at least a portion of text is relevant to a particular domain. For example, the device 1000 may calculate a confidence score indicating the degree of a relevance of text obtained from the encoder output value to a domain pre-registered to decode the encoder output value. Furthermore, the device 1000 may identify a domain related to the encoder output value based on a domain confidence level calculated for the pre-registered domain. The device 1000 may identify a domain related to the encoder output value based on a rule or obtain a domain confidence level related to the encoder output value using an artificial intelligence (AI) model trained for domain identification. Furthermore, for example, the AI model for domain identification may be a part of an NLU model or a model separate therefrom.

Although it has been described above that the device 1000 provides an encoder output value, encoding information, and domain information to the server 2000 while requesting a text string from the server 2000, embodiments of the disclosure are not limited thereto. For example, the device 1000 may provide only an encoder output value or only the encoder output value and encoding information to the server 2000.

The server 2000 may determine a domain for decoding (operation S325). When the server 2000 receives domain information from the device 1000, the server 2000 may identify a domain related to the encoder output value based on the domain information. On the other hand, when the server 2000 does not receive domain information from the device 1000, the server 2000 may identify a domain related to the encoder output value using the domain identification module 1450 (refer to FIG. 14) in the server 2000. For example, the server 2000 may receive, from the device 1000, text obtained from a projection layer connected to an output terminal of the encoder in the device 1000 and identify a domain related to the encoder output value using the received text. As another example, the server 2000 may obtain text by applying a projection layer to the encoder output value based on encoding information received from the device 1000 and identify a domain related to the encoder output value using the obtained text. In this case, the server 2000 may identify a domain related to the encoder output value based on a domain confidence level for the text generated from the encoder output value. A domain confidence level may include, for example, a numerical value indicating how closely at least a portion of text is relevant to a particular domain. For example, the server 2000 may calculate a confidence score indicating the degree of a relevance of text obtained from the encoder output value to a domain pre-registered to decode the encoder output value. Furthermore, the server 2000 may identify a domain related to the encoder output value based on a domain confidence level calculated for the pre-registered domain. The server 2000 may identify a domain related to the encoder output value based on a rule or obtain a domain confidence level related to the encoder output value using an AI model trained for domain identification. Furthermore, for example, the AI model for domain identification may be a part of an NLU model or a model separate therefrom. The server 2000 may identify a domain related to an encoder output value by analyzing the encoder output value and a format of the encoder output value and applying a projection layer to the encoder output value based on a result of the analysis.

The server 2000 may identify a type of the encoder and a degree of encoding (operation S330). When the server 2000 receives encoding information from the device 1000, the server 2000 may identify a type of the encoder that outputs the encoder output value and a degree of encoding based on the encoding information. When the server 2000 does not receive encoding information from the device 1000, the server 2000 may identify a type of the encoder and a degree of encoding by analyzing the encoder output value and a format of the encoder output value. For example, the server 2000 may identify a type of the encoder and a degree of encoding using an encoder identification module 2311 of FIG. 13.

The server 2000 may select a decoder for generating a text string (operation S335). The server 2000 may include decoders related to a plurality of domains and select at least one domain related to an encoder output value from among the domains. For example, the server 2000 may select a domain corresponding to the domain determined in operation S325. The domain corresponding to the determined domain may be identical or similar to the determined domain. For example, when a plurality of domains related to decoders in the server 2000 are "movie", "place", and "region name", and the domain identified in operation S325 is "movie", the server 2000 may select "movie". For example, when a plurality of domains related to decoders in the server 2000 are "video content", "place", "region name", and the domain identified in operation S325 is "movie", the server 2000 may select "video content". In this case, information about an identification value similar to an identification value of the domain selected by the server 2000 may be stored in the server 2000.

Furthermore, the server 2000 may select at least one decoder to decode an identification value of the encoder from among a plurality of decoders corresponding to the selected domain. The server 2000 may select at least one decoder capable of decoding the encoder output value, based on the type of encoder identified in operation S330. For example, when the identified type of encoder is an encoder used in an attention-based end-to-end ASR model, the server 2000 may select a decoder used in the attention-based end-to-end ASR model. Furthermore, for example, when the identified type of encoder is an encoder used in an RNN transducer (RNN-T) based end-to-end ASR model, the server 2000 may select a decoder used in the RNN-T based end-to-end ASR model. However, embodiments of the disclosure are not limited thereto, and the server 2000 may select various decoders according to preset criteria, and in this case, may convert a format of the encoder output value into a format suitable for the selected decoder. For example, the server 2000 may identify a type of encoder and a degree of encoding using a decoder selection module (e.g., 2313 of FIG. 13).

The server 2000 may generate a text string based on the encoder output value using the selected decoder (operation S340). The server 2000 may input the encoder output value to the selected decoder and obtain a text string based on a decoder output value from the decoder. In this case, the server 2000 may preprocess the format of the encoder output value into a format suitable for the selected decoder and input a preprocessed result to the decoder. A method, performed by the server 200, of preprocessing an encoder output value will be described in greater detail below with reference to FIG. 5.

When the server 2000 selects a plurality of decoders, the server 2000 may generate a plurality of text strings using output values respectively obtained from the decoders by inputting encoder output values to the decoders, respectively.

The server 2000 may provide the text string to the device 1000 (operation S345). When the server 2000 generates a plurality of text strings using a plurality of decoders, the server 2000 may compare confidence levels of the text strings with one another and provide a text string having a high confidence level to the device 1000. A confidence level of a generated text string may include, for example, a numerical value indicating the degree of matching between the generated text string and an input speech, and the confidence level may include, for example, a confidence score, but is not limited thereto.

When it is determined in operation S315 that the encoder output value is not to be transmitted to the server 2000 ("No" in operation S315), the device 1000 may provide the encoder output value to a decoder in the device 1000 (operation S350) and obtain a text string from the encoder output value using the decoder (operation S355).

The device 1000 may register the domain with itself (operation S360). When the device 1000 registers a particular domain therewith and determines that an encoder output value generated after the registration is related to the registered domain, the device 1000 may process the encoder output value using a decoder in the device 1000 without transmitting the encoder output value to the server 2000. For example, the device 1000 may register a domain using the domain registration module (e.g., 1460 of FIG. 14).

For domain registration, for example, the device 1000 may evaluate the text string received from the server 2000 and register a domain related to the evaluated text string with the device 1000 based on a result of the evaluation. The device 1000 may obtain text from the encoder output value and evaluate the text string received from the server 2000 by comparing the obtained text with the received text string. Furthermore, when text obtained from an encoder output value related to a particular domain matches the text string received from the server 2000 more than a preset number of times, the particular domain may be registered with the device 1000.

The device 1000 may identify confidence levels of encoder output values and a domain related to the encoder output values, and when the confidence levels of the encoder output values related to the identified domain are each greater than or equal to a preset threshold, the device 1000 may register the identified domain with the device 1000.

Moreover, although it has been described with reference to FIG. 3 that the device 1000 requests a text string from the server 2000, and the server 2000 provides the text string to the device 1000, embodiments are not limited thereto. The server 2000 may provide various types of voice assistant services to the device 1000 using the text string obtained in operation S340. A voice assistant service may include, for example, a service that provides conversations with a user. In the voice assistant service, a voice assistant may provide a response message to the user as if a human directly talks to the user taking into account a user's situation, device conditions, etc. Furthermore, in the voice assistant service, the voice assistant may act as a user's personal assistant to appropriately create information for the user and provide the information to the user. For example, the voice assistant service may be linked to various types of services to provide requested information or functions to the user. The various types of services may include, for example, and without limitation, broadcast services, content sharing services, content provision services, power management services, game provision services, chat services, document creation services, search services, call services, photo capture services, transportation recommendation services, video playback services, and the like.

In this case, in order to provide a voice assistant service based on the text string, the server 2000 may provide information for performing a conversation with the user to the device 1000 using, for example, an NLU model, a dialog manager (DM) model, a natural language generating (NLG)

model, etc. in the server 2000. Furthermore, the server 2000 may directly control another device 1000 based on a result of interpreting the text string. In addition, the server 2000 may generate control information necessary for the device 1000 to control the other device 1000 based on the result of interpreting the text string and provide the generated control information to the device 1000.

Figure 4:
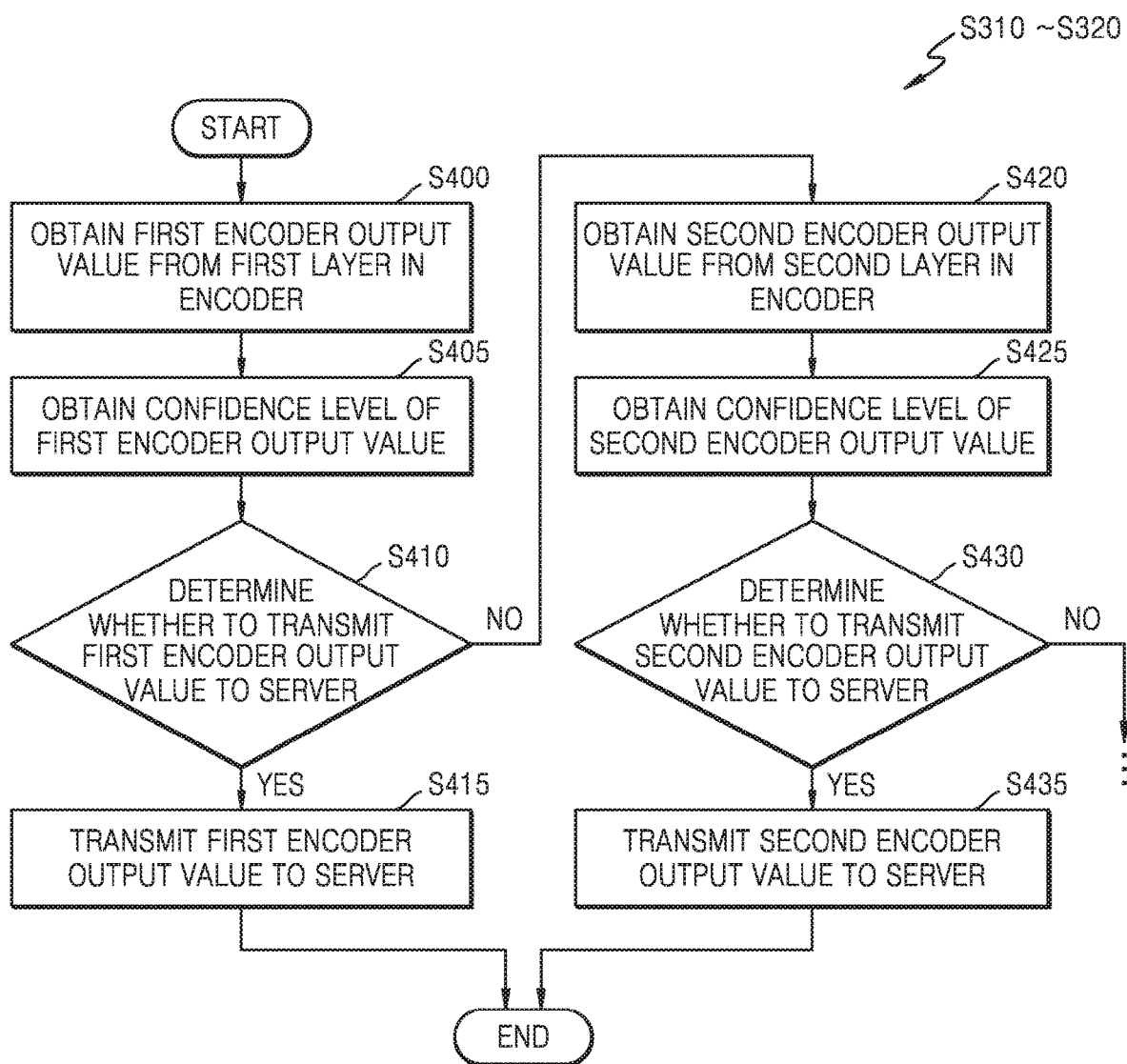
FIG. 4 is a flowchart illustrating an example method, performed by a device, of transmitting output values obtained from a plurality of layers in an encoder to a server, according to an embodiment of the disclosure.

FIG. 4 is a flowchart illustrating an example method, performed by the device 1000, of transmitting output values obtained from a plurality of layers in an encoder to the server 2000, according to an embodiment of the disclosure.

The device 1000 may perform its operations illustrated in FIG. 4 by executing instructions stored in the memory of the device 1000. For example, the device 1000 may perform its operations illustrated in FIG. 4 by executing at least one of the speech recognition evaluation module 1430, the domain identification module 1450, the ASR model 1410, or the NLU model 1420, as described in greater detail below with reference to FIG. 14. However, embodiments of the disclosure are not limited thereto, and the device 1000 may execute other programs stored in the memory in order to perform preset operations.

The device 1000 may obtain a first encoder output value from a first layer in the encoder (operation S400). The first layer in the encoder may be one of a plurality of stacked LSTM layers in the encoder, and the first encoder output value may include, for example, a hidden layer vector output from the first layer.

The device 1000 may obtain a confidence level of the first encoder output value (operation S405). The device 1000 may obtain text from the first encoder output value from the first layer using, for example, a projection layer connected to an output terminal of the first layer. Furthermore, the device 1000 may calculate a confidence level of the first encoder output value based on the obtained text. The confidence level of the first encoder output value may include, for example, a numerical value indicating a degree of matching between the first encoder output value and an input speech, and the confidence level may include, for example, a confidence score, but is not limited thereto.

The device 1000 may determine whether to transmit the first encoder output value to the server 2000 (operation S410). The device 1000 may compare the confidence level of the first encoder output value with a preset threshold and determine whether to transmit the first encoder output value to the server 2000 based on a result of the comparison.

Furthermore, the device 1000 may identify whether a domain related to the first encoder output value corresponds to a domain registered with the device 1000, and when the domain related to the first encoder output value does not correspond to the registered domain, the device 1000 may determine whether to transmit the first encoder output value to the server 2000.

When the device 1000 determines to transmit the first encoder output value to the server 2000 ("Yes" in operation S410), the device 1000 may transmit the first encoder output value to the server 2000 (operation S415). In this case, the server 2000 may have both an encoder and a decoder of an end-to-end ASR model, and the first encoder output value transmitted to the server 2000 may be input to an output terminal of a first layer of the encoder in the server 2000.

When the device 1000 determines not to transmit that the first encoder output value to the server 2000 ("No" in operation S410), the device 1000 may obtain a second encoder output value from a second layer of the encoder (operation S420). The second layer of the encoder may include, for example, one of a plurality of stacked LSTM layers in the encoder, and may be a layer after the first layer. Furthermore, the second encoder output value may be a hidden layer vector output from the second layer.

The device 1000 may obtain a confidence level of the second encoder output value (operation S425). The device 1000 may obtain text from the second encoder output value from the second layer using, for example, a projection layer connected to an output terminal of the second layer. Furthermore, the device 1000 may calculate a confidence level of the second encoder output value based on the obtained text. The confidence level of the second encoder output value may include, for example, a numerical value indicating a degree of matching between the second encoder output value and the input speech, and the confidence level may include, for example, a confidence score, but is not limited thereto.

The device 1000 may determine whether to transmit the second encoder output value to the server 2000 (operation S430). The device 1000 may compare the confidence level of the second encoder output value with a preset threshold and determine whether to transmit the second encoder output value to the server 2000 based on a result of the comparison.

Furthermore, the device 1000 may identify whether a domain related to the second encoder output value corresponds to a domain registered with the device 1000, and when the domain related to the second encoder output value does not correspond to the registered domain, the device 1000 may determine whether to transmit the second encoder output value to the server 2000.

When the device 1000 determines to transmit the second encoder output value to the server 2000 ("Yes" in operation S430), the device 1000 may transmit the second encoder output value to the server 2000 (operation S435). In this case, the server 2000 may have both an encoder and a decoder of an end-to-end ASR model, and the second encoder output value transmitted to the server 2000 may be input to an output terminal of a second layer of the encoder in the server 2000.

Figure 5:
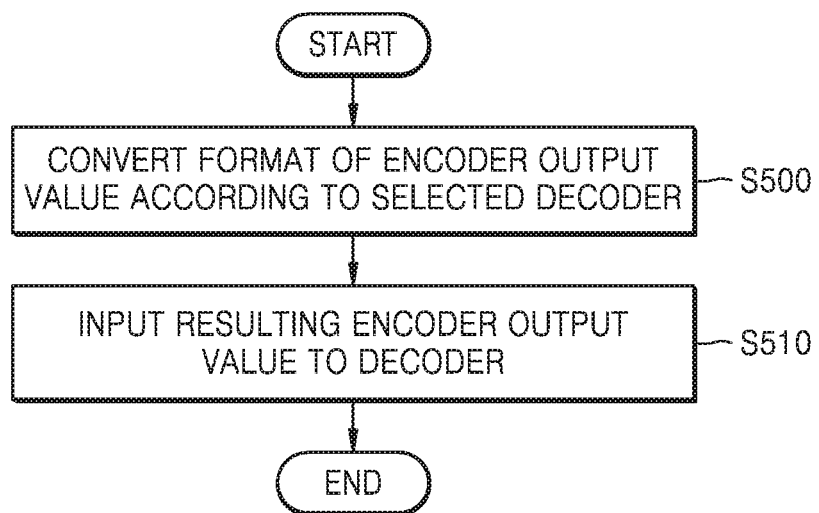
FIG. 5 is a flowchart illustrating an example method, performed by a server, of inputting an encoder output value to a selected decoder, according to an embodiment of the disclosure.

FIG. 5 is a flowchart illustrating an example method, performed by the server 2000, of inputting an encoder output value to a selected decoder, according to an embodiment of the disclosure.

The server 2000 may perform its operations illustrated in FIG. 5 by executing instructions stored in the storage of the server 2000. For example, the server 2000 may perform its operations illustrated in FIG. 5 by executing an output value conversion module 2314 as described in detail below with reference to FIG. 13.

The server 2000 may convert a format of an encoder output value according to a selected decoder (operation S500). When the format of the encoder output value is different from a format of an input value to be fed into the decoder selected in operation S335, the server 2000 may convert the format of the encoder output value received from the device 1000. In this case, the server 2000 may convert the format of the encoder output value using a tool for converting the encoder output value into a format compatible with the selected decoder. Furthermore, to allow encoder output values of various formats to be fed into various types of decoders, the server 2000 may store conversion tools corresponding to each of combinations of a plurality of types of encoders and a plurality of types of decoders. For example, to allow n types of encoder output values to be fed into m types of decoders, the server 2000 may store at least one conversion tool capable of performing n×m types of data conversions.

The server 2000 may input the resulting encoder output value to the selected decoder (operation S510). The server 2000 may obtain a text string using a decoder output value that is obtained from the decoder based on the resulting encoder output value.

Figure 6A:
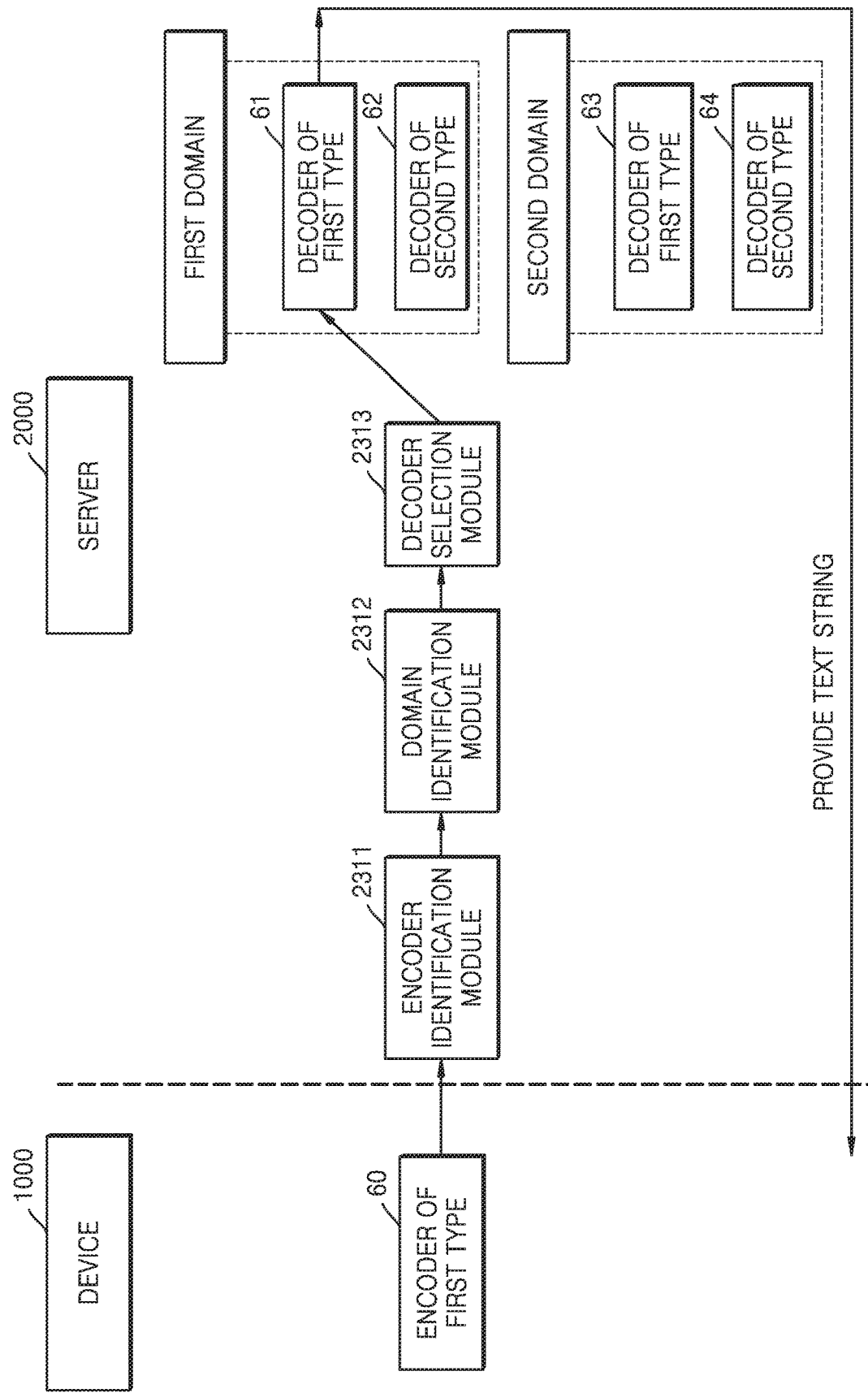
FIG. 6A is a diagram illustrating an example in which a server selects one decoder corresponding to a particular domain to process an encoder output value, according to an embodiment of the disclosure.

FIG. 6A is a diagram illustrating an example in which the server 2000 selects one decoder corresponding to a particular domain to process an encoder output value, according to an embodiment of the disclosure.

Referring to FIG. 6A, an encoder output value from an encoder of first type 60 in the device 1000 may be provided to an encoder identification module (e.g., including processing circuitry and/or executable program elements) 2311 in the server 2000. The encoder identification module 2311 of the server 2000 may receive the encoder output value and identify a type of the encoder of first type 60 that outputs the encoder output value. When the device 1000 provides encoding information to the server 2000, the encoder identification module 2311 may identify a type of the encoder of first type 60 as being the first type based on the encoding information provided by the device 1000. When the device 1000 does not provide encoding information to the server 2000, the encoder identification module 2311 may identify the type of the encoder of first type 60 as being the first type by analyzing the encoder output value provided by the device 1000 and a format of the encoder output value.

A domain identification module (e.g., including processing circuitry and/or executable program elements) 2312 of the server 2000 may identify a domain related to the encoder output value provided by the device 1000. When the device 1000 provides domain information to the server 2000, the domain identification module 2312 may identify that the encoder output value is related to a first domain based on the domain information provided by the device 1000. When the device 1000 does not provide the domain information to the server 2000, the domain identification module 2312 may use the encoder output value provided by the device 1000 to identify a domain related to the encoder output value as being the first domain. For example, by applying, to the encoder output value, a projection layer suitable for the encoder output value and the format of the encoder output value, the domain identification module 2312 may obtain text from the projection layer and identify a domain related to the encoder output value as being the first domain based on the obtained text. In this case, the server 2000 may identify a domain related to the encoder output value based on a domain confidence level for the text generated from the encoder output value. For example, the server 2000 may calculate domain confidence levels, each indicating the degree of a relevance between the text obtained from the encoder output value and each of the first and second domains. Furthermore, for example, the server 2000 may identify a domain related to the encoder output value as being the first domain by comparing the domain confidence levels respectively calculated for the first and second domains with each other.

A decoder selection module (e.g., including processing circuitry and/or executable program elements) 2313 of the server 2000 may select a decoder to decode the encoder output value. The decoder selection module 2313 may select a decoder of first type 61 corresponding to the first domain from among a plurality of decoders, e.g., sets of decoders of first and second types 61 and 62 and 63 and 64 in the server 2000, based on the type of encoder identified by the encoder identification module 2311 and the domain identified by the domain identification module 2312.

The encoder output value may be input to the decoder of first type 61, and the server 2000 may obtain a text string based on an output value from the decoder of first type 61. In addition, the server 2000 may provide the obtained text string to the device 1000.

Figure 6B:
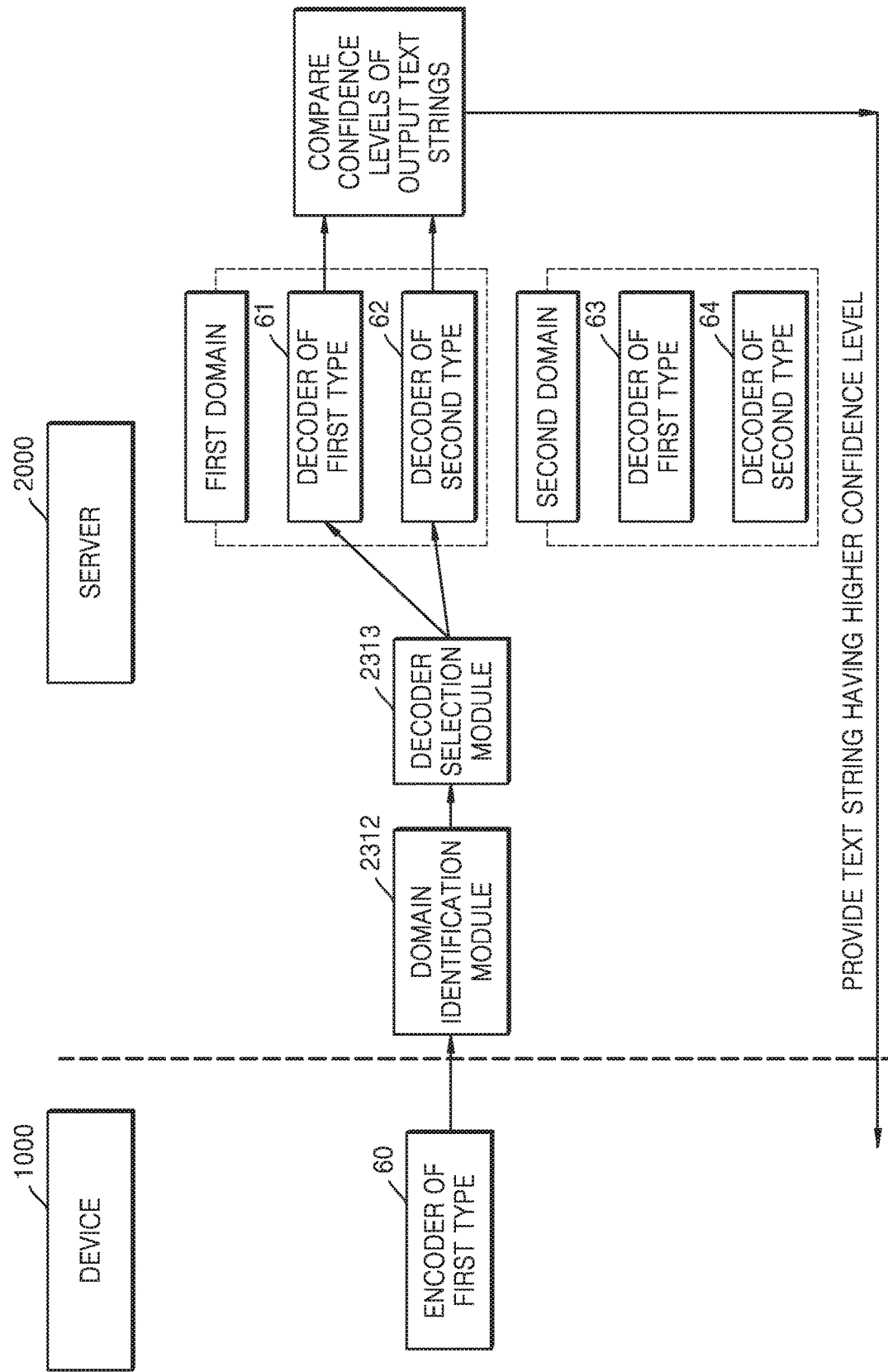
FIG. 6B is a diagram illustrating an example in which a server selects a plurality of decoders corresponding to a particular domain to process an encoder output value, according to an embodiment of the disclosure.

FIG. 6B is a diagram illustrating an example in which the server 2000 selects a plurality of decoders corresponding to a particular domain to process an encoder output value, according to an embodiment of the disclosure.

Referring to FIG. 6B, an encoder output value from the encoder of first type 60 in the device 1000 may be provided to a domain identification module 2312 in the server 2000. The domain identification module 2312 may identify a domain related to the encoder output value provided by the device 1000. When the device 1000 provides domain information to the server 2000, the domain identification module 2312 may identify that the encoder output value is related to a first domain based on the domain information provided by the device 1000. When the device 1000 does not provide the domain information to the server 2000, the domain identification module 2312 may use the encoder output value provided by the device 1000 to identify a domain related to the encoder output value as being a first domain. For example, by applying, to the encoder output value, a projection layer suitable for the encoder output value and a format of the encoder output value, the domain identification module 2312 may obtain text from the projection layer and identify a domain related to the encoder output value as being the first domain based on the obtained text. In this case, the server 2000 may identify a domain related to the encoder output value based on a domain confidence level for the text generated from the encoder output value.

A decoder selection module 2313 of the server 2000 may select a decoder to decode the encoder output value. The decoder selection module 2313 may select, based on the domain identified by the domain identification module 2312, a decoder of first type 61 and a decoder of second type 62, each corresponding to the first domain, from among a plurality of decoders, e.g., a set of the decoders of first and second types 61 and 62 and a set of decoders of first and second types 63 and 64 in the server 2000.

The encoder output value may be input to the decoder of first type 61, and the server 2000 may obtain a first text string based on an output value from the decoder of first type 61. Furthermore, the encoder output value may be converted into a format suitable for the decoder of second type 62 and then input to the decoder of second type 62, and the server 2000 may obtain a second text string based on an output value from the decoder of second type 62.

The server 2000 may compare a confidence level of the first text string with that of the second text string, select a text string having a higher confidence level, and provide the selected text string to the device 1000. A confidence level of a text string may be a numerical value indicating a degree of matching between the obtained text string and the input speech, and the confidence level may include, for example, a confidence score, but is not limited thereto.

FIG. 6C is a diagram illustrating an example in which the server 2000 selects a plurality of decoders corresponding to a plurality of domains to process an encoder output value, according to an embodiment of the disclosure;

Referring to FIG. 6C, an encoder output value from the encoder of first type 60 in the device 1000 may be provided to a decoder selection module 2313 in the server 2000. The decoder selection module 2313 of the server 2000 may select a decoder to decode the encoder output value. The decoder selection module 2313 may select a plurality of decoders, e.g., a set of decoders of first and second types 61 and 62 and a set of decoders of first and second types 63 and 64, the sets respectively corresponding to a plurality of domains, e.g., first and second domains in the server 2000.

The encoder output value may be input to the decoder of first type 61 corresponding to the first domain, and the server 2000 may obtain a first text string based on an output value from the decoder of first type 61 corresponding to the first domain. Furthermore, the encoder output value may be converted into a format suitable for the decoder of second type 62 corresponding to the first domain and then input to the decoder of second type 62 corresponding to the first domain, and the server 2000 may obtain a second text string based on an output value from the decoder of second type 62 corresponding to the first domain.

Furthermore, the encoder output value may be input to the decoder of first type 63 corresponding to the second domain, and the server 2000 may obtain a third text string based on an output value from the decoder of first type 63 corresponding to the second domain. In addition, the encoder output value may be converted into a format suitable for the decoder of second type 64 corresponding to the second domain and then input to the decoder of second type 64 corresponding to the second domain, and the server 2000 may obtain a fourth text string based on the output value from the decoder of second type 64 corresponding to the second domain.

The server 2000 may compare confidence levels of the first through fourth text strings with one another, select a text string having a high confidence level, and provide the selected text string to the device 1000.

Figure 6D:
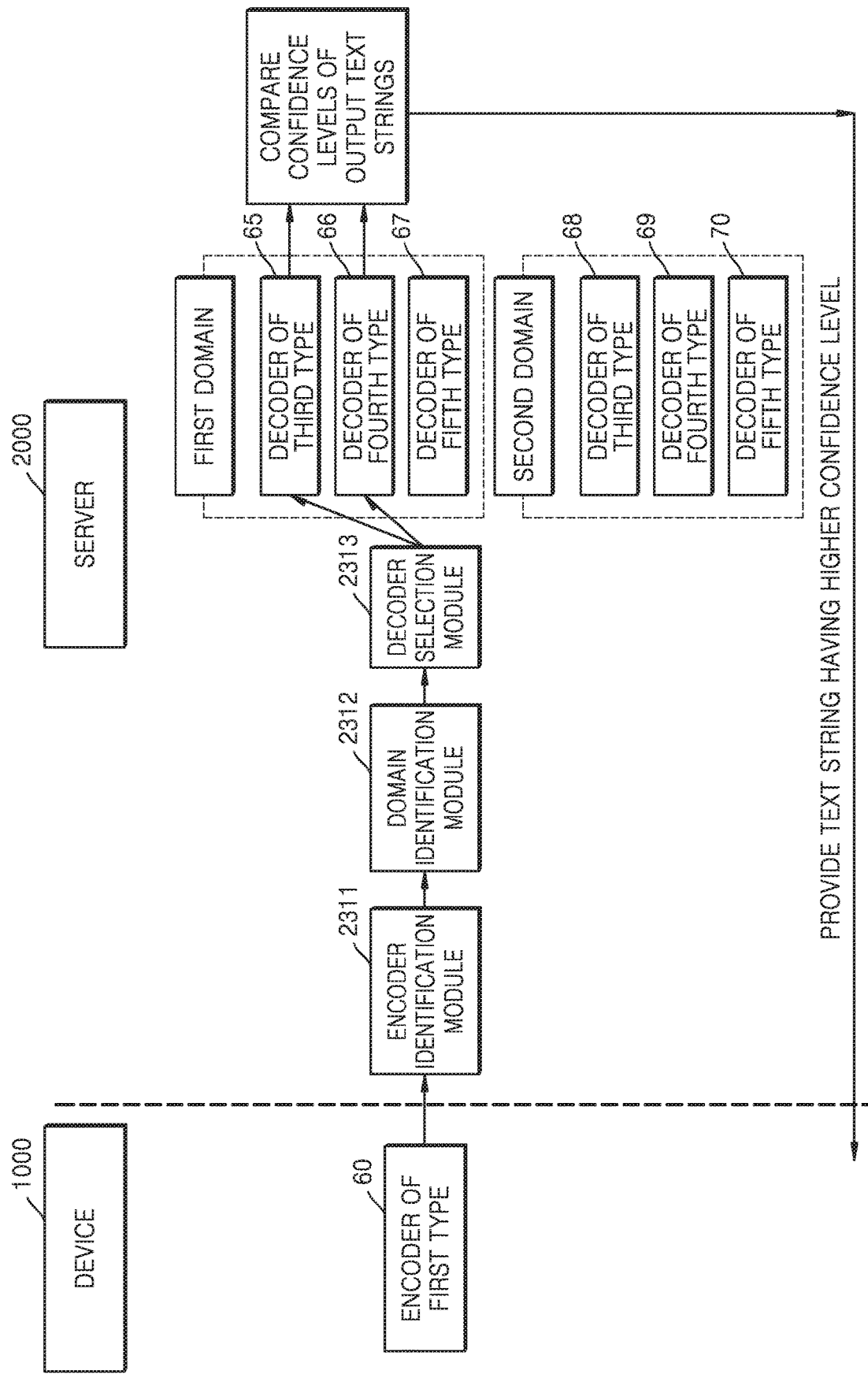
FIG. 6D is a diagram illustrating an example in which a server selects, based on a decoder of the same type as an encoder of a device not being in the server, a different type of decoder to process an encoder output value, according to an embodiment of the disclosure.

FIG. 6D is a diagram illustrating an example in which the server 2000 selects, based on a decoder of the same type as an encoder of a device not being in the server 2000, a different type of decoder to process an encoder output value, according to an embodiment of the disclosure;

Referring to FIG. 6D, the server 2000 may not include a decoder of the same type as the encoder of first type 60 in the device 1000. In this case, a decoder selection module 2313 may select a decoder to process an encoder output value from the encoder of first type 60 from among a plurality of decoders, e.g., a set of decoders of third (65) through fifth (67) types 65 through 67 and a set of decoders of third (68) through fifth (70) types 68 through 70, the sets respectively corresponding to a plurality of domains, e.g., first and second domains. For example, the server 2000 may select the decoder of third type 65 and the decoder of fourth type 66 that are of different types than the encoder of first type 60.

Accordingly, the encoder output value may be converted into a format suitable for the decoder of third type 65 and then input to the decoder of third type 65, and the server 2000 may obtain a fifth text string based on an output value from the decoder of third type 65. In addition, the encoder output value may be converted into a format suitable for the decoder of fourth type 66 and then input to the decoder of fourth type 66, and the server 2000 may obtain a sixth text string based on an output value from the decoder of fourth type 66. The server 2000 may compare a confidence level of the fifth text string with that of the sixth text string, select a text string having a higher confidence level, and provide the selected text string to the device 1000.

Figure 7A:
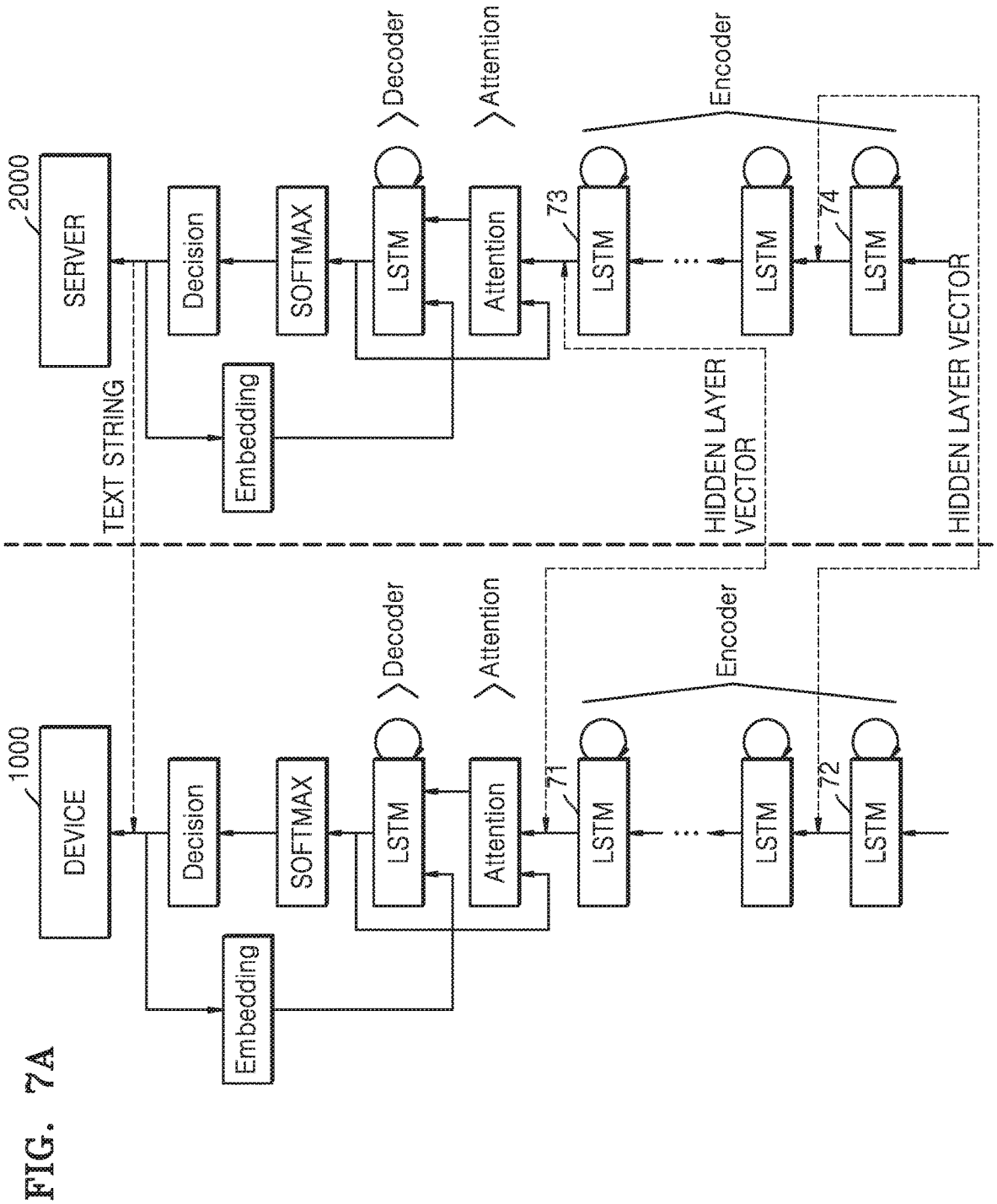
FIG. 7A is a diagram illustrating an example in which a device and a server obtain a text string from a speech signal based on the device and the server respectively including attention-based automatic speech recognition (ASR) models according to an embodiment of the disclosure.

FIG. 7A is a diagram illustrating an example in which the device 1000 and the server 2000 obtain a text string from a speech signal based on the device 1000 and the server 2000 each including attention-based ASR models according to an embodiment of the disclosure.

Referring to FIG. 7A, the device 1000 and the server 2000 may each include an attention-based ASR model. An attention-based ASR model may include an encoder and a decoder, each including an RNN. An encoder of an attention-based ASR model may compute an output from a feature vector for a speech signal frame-by-frame, and the decoder may determine which encoder output value corresponding to a frame should be attended to, select an encoder output value according to an attention weight, and estimate a text string using selected encoder output value as input.

An encoder of an attention-based ASR model in the device 1000 may include a plurality of stacked LSTM layers, and the device 1000 may provide the server 2000 with a hidden layer vector that is an encoder output value from a last LSTM layer 71 in the encoder of the attention-based ASR model in the device 1000 itself. Furthermore, the hidden layer vector received from the device 1000 may be fed into an output terminal of a last LSTM layer 73 in an encoder of an attention-based ASR model in the server 2000.

The device 1000 may provide the server 2000 with a hidden layer vector that is an encoder output value from an LSTM layer 72 in the encoder of the attention-based ASR model in the device 1000. Furthermore, the hidden layer vector received from the device 1000 may be fed into an output terminal of an LSTM layer 74 in the encoder of the attention-based ASR model in the server 2000. The LSTM layer 74 in the encoder of the attention-based ASR model in the server 2000 may be a layer corresponding to the LSTM layer 72 in the encoder of the attention-based ASR model in the device 1000.

Furthermore, the server 2000 may provide the device 1000 with a text string that is output from the attention-based ASR model using, for example, a hidden layer vector received from the device 1000. The server 2000 may identify a domain related to the hidden layer vector received from the device 1000 and select an attention-based ASR model corresponding to the identified domain from among a plurality of attention-based ASR models in the server 2000. In addition, the server 2000 may obtain a text string as an output value by inputting the hidden layer vector received from the device 1000 to the selected attention-based ASR model.

Figure 7B:
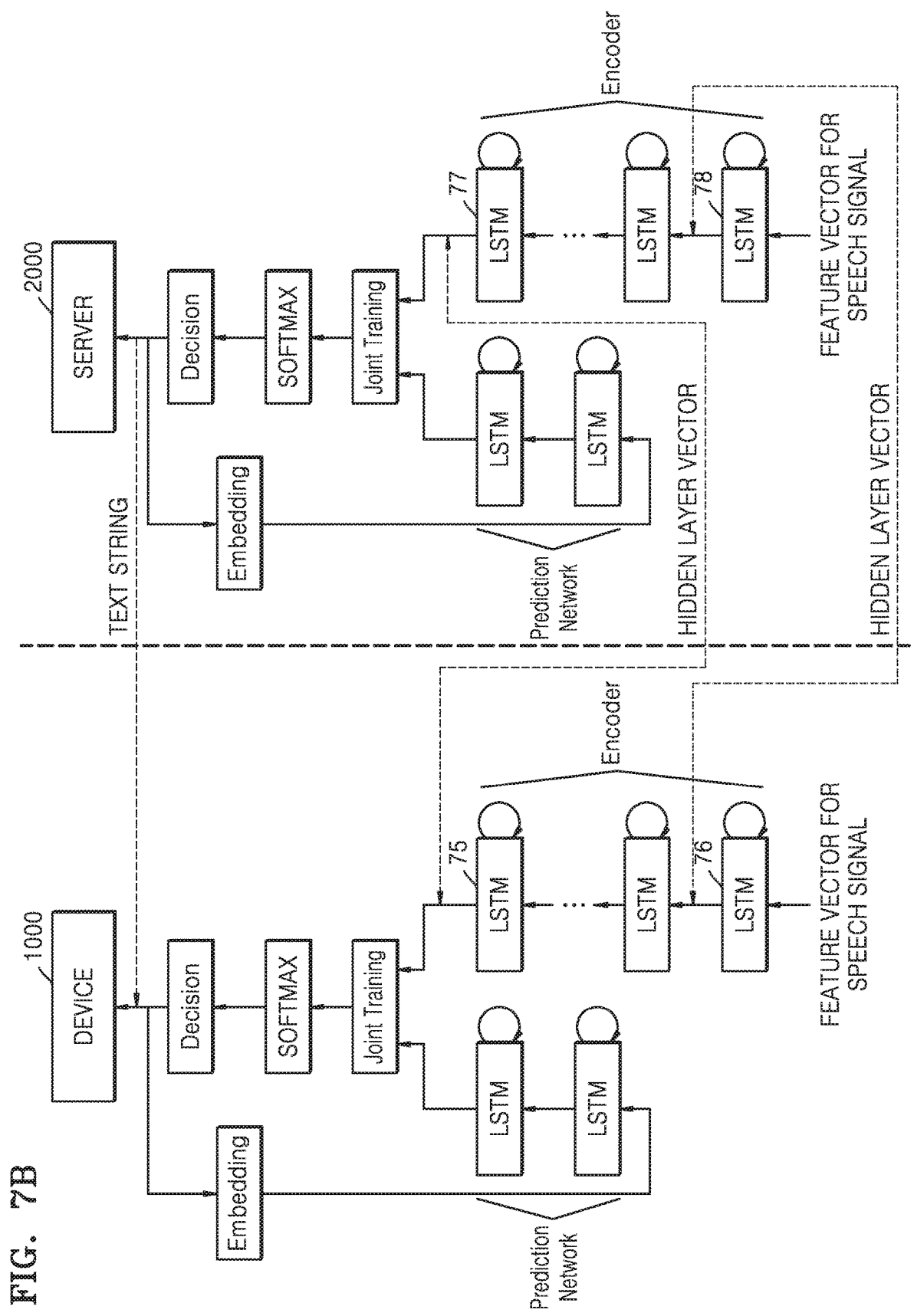
FIG. 7B is a diagram illustrating an example in which a device and a server obtain a text string from a speech signal based on the device and the server respectively including recurrent neural network transducer (RNN-T) based ASR models according to an embodiment of the disclosure.

FIG. 7B is a diagram illustrating an example in which the device 1000 and the server 2000 obtain a text string from a speech signal based on the device 1000 and the server 2000 each including RNN-T based ASR models according to an embodiment of the disclosure.

Referring to FIG. 7B, the device 1000 and the server 2000 may each include, for example, an RNN-T based ASR model. In the RNN-T ASR model, a prediction network may be connected to an encoder to achieve an effect of post-processing an encoder output value via a language model.

An encoder of an attention-based ASR model in the device 1000 may include a plurality of stacked LSTM layers, and the device 1000 may provide the server 2000 with a hidden layer vector that is an encoder output value from a last LSTM layer 75 in the encoder of the RNN-T based ASR model in the device 1000. Furthermore, the hidden layer vector received from the device 1000 may be fed into an output terminal of a last LSTM layer 77 in an encoder of an RNN-T based ASR model in the server 2000.

The device 1000 may provide the server 2000 with a hidden layer vector that is an encoder output value from an LSTM layer 76 in the encoder of the RNN-T based ASR model in the device 1000. Furthermore, the hidden layer vector received from the device 1000 may be fed into an output terminal of an LSTM layer 78 in the encoder of the RNN-T based ASR model in the server 2000. The LSTM layer 78 in the encoder of the RNN-T based ASR model in the server 2000 may be a layer corresponding to the LSTM layer 76 in the encoder of the RNN-T based ASR model in the device 1000.

Furthermore, the server 2000 may provide the device 1000 with a text string that is output from the RNN-T based ASR model using, for example, a hidden layer vector received from the device 1000. The server 2000 may identify a domain related to the hidden layer vector received from the device 1000 and select an RNN-T based ASR model corresponding to the identified domain from among a plurality of RNN-T based ASR models in the server 2000. In addition, the server 2000 may obtain a text string as an output value by inputting the hidden layer vector received from the device 1000 to the selected RNN-T based ASR model.

FIG. 8A is a diagram illustrating an example in which the device 1000 and the server 2000 obtain a text string from a speech signal based on encoders of attention-based ASR models not being included in the server 2000, according to an embodiment of the disclosure.

Referring to FIG. 8A, the device 1000 may include both an encoder and a decoder of an attention-based ASR model, and the server 2000 may include only decoders of an attention-based ASR model. For example, the server 2000 may include, as the decoders of the attention-based ASR model, a decoder corresponding to domain A and a decoder corresponding to domain B. Accordingly, an output value of the encoder of the attention-based ASR model in the device 1000 may be provided to at least one of the decoder corresponding to domain A or the decoder corresponding to domain B in the server 2000.

Figure 8B:
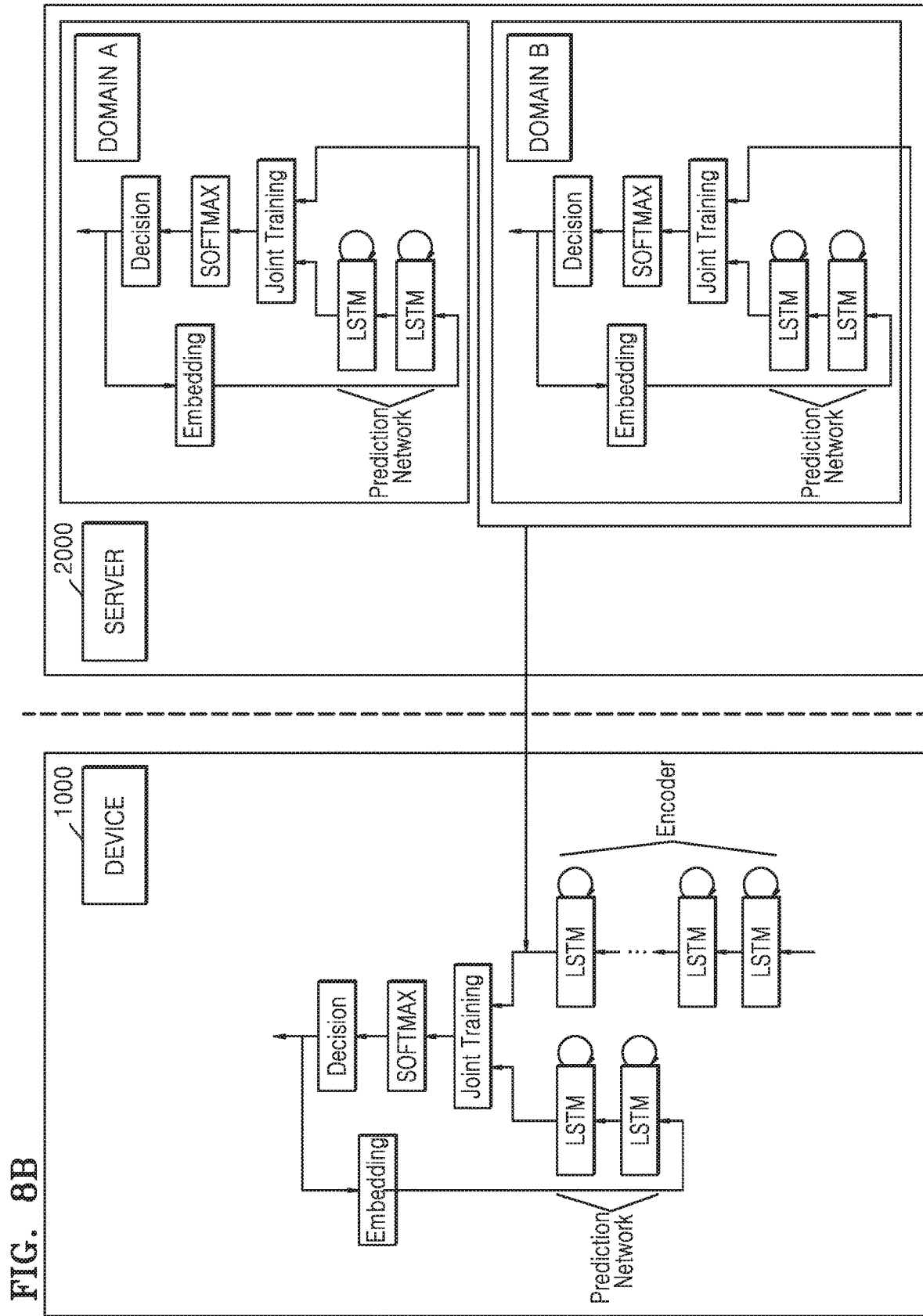
FIG. 8B is a diagram illustrating an example in which a device and a server obtain a text string from a speech signal based on encoders of RNN-T based ASR models not being included in the server, according to an embodiment of the disclosure.

FIG. 8B is a diagram illustrating an example in which the device 1000 and the server 2000 obtain a text string from a speech signal based on encoders of RNN-T based ASR models not being included in the server 2000, according to an embodiment of the disclosure.

Referring to FIG. 8B, the device 1000 may include both an encoder and a decoder of an RNN-T based ASR model, and the server 2000 may include only decoders of an RNN-T based ASR model. For example, the server 2000 may include, as the decoders of the RNN-T based ASR model, a decoder corresponding to domain A and a decoder corresponding to domain B. Accordingly, an output value of the encoder of the RNN-T based ASR model in the device 1000 may be provided to at least one of the decoder corresponding to domain A or the decoder corresponding to domain B in the server 2000.

Figure 9:
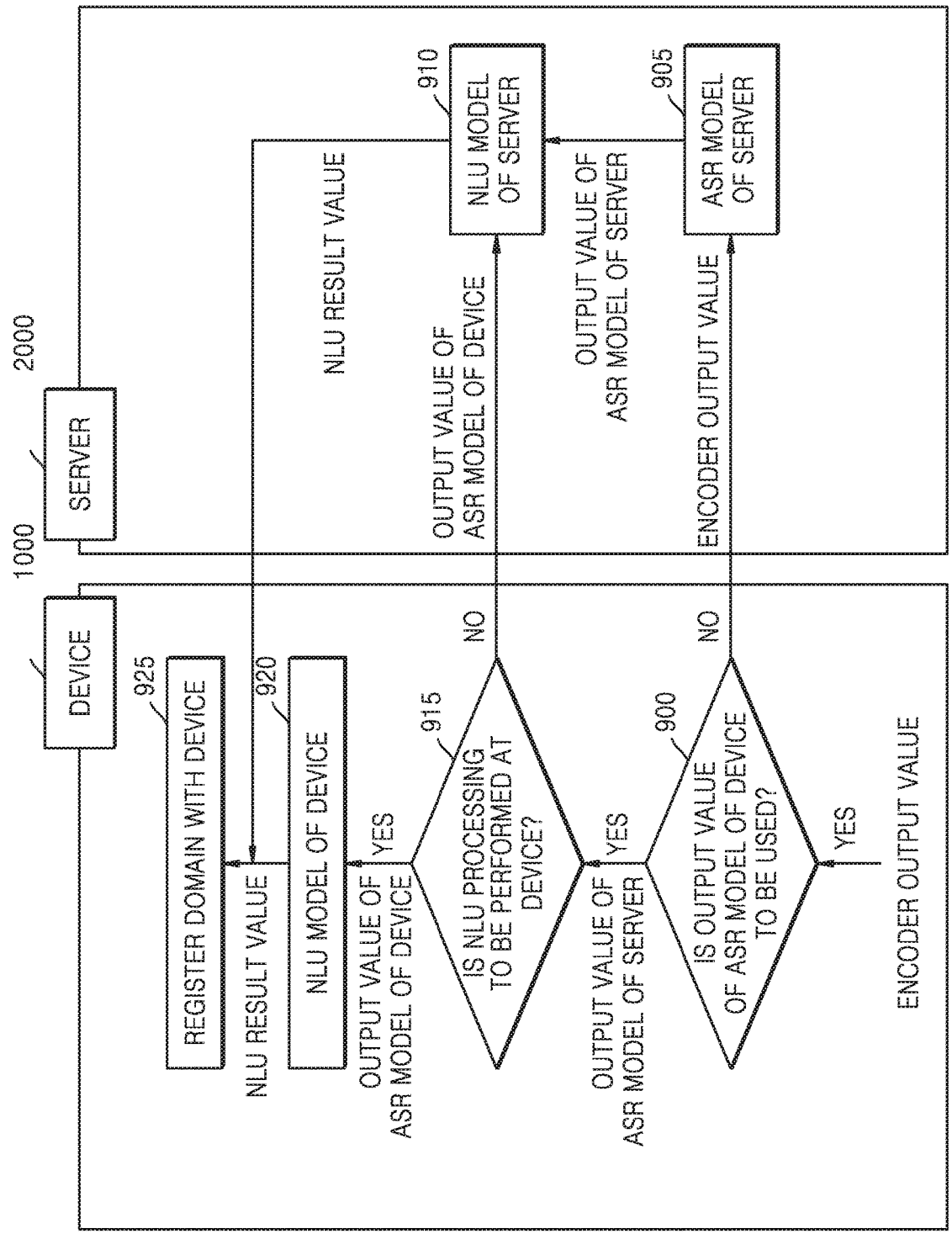
FIG. 9 is a flowchart illustrating an example method, performed by a device and a server, of performing speech recognition and natural language understanding (NLU) processing on a speech input, according to an embodiment of the disclosure.

FIG. 9 is a flowchart illustrating an example method, performed by the device 1000 and the server 2000, of performing speech recognition and NLU processing on a speech input, according to an embodiment of the disclosure.

Referring to FIG. 9, the device 1000 may determine whether to use an output value of its ASR model and whether to perform NLU processing at the device 1000 itself.

The device 1000 may determine whether to use an output value of its ASR model based on an encoder output value from the ASR model (operation 900). The device 1000 may obtain a confidence level of the encoder output value and determine whether to use the output value of the ASR model by comparing the confidence level of the encoder output value with a preset threshold. When the confidence level of the encoder output value is greater than or equal to the preset threshold, the device 1000 may determine to use the output value of the ASR model. On the other hand, when the confidence level of the encoder output value is less than the preset threshold, the device 1000 may determine not to use the output value of the ASR model. The confidence level of the encoder output value may represent a degree of matching between text represented by the encoder output value and an input speech. For example, when an encoder of the ASR model in the device 1000 is trained, a CTC loss function may be used. In this case, by connecting a projection layer to an output terminal of the encoder, text may be obtained from the projection layer. Furthermore, the device 1000 may calculate a confidence level of an encoder output value based on the text obtained from the projection layer connected to the output terminal of the encoder. However, a method of calculating (e.g., determining) a confidence level is not limited thereto, and for example, the device 1000 may calculate a confidence level directly from an encoder output value using a preset algorithm. As another example, the device 1000 may obtain a confidence level of an encoder output value using the speech recognition evaluation module (e.g., 1430 of FIG. 14).

The device 1000 may determine whether to use an output value of its ASR model based on the output value of the ASR model (operation 900). The output value of the ASR model of the device 1000 may be, for example, at least one text string generated from a feature vector for a speech signal. The output value of the ASR model of the device 1000 may be a text string obtained when decoding an encoder output value from the encoder (1411 of FIG. 14) in the ASR model of the device 1000 using the decoder (1412 of FIG. 14) in the ASR model of the device 1000. The device 1000 may determine whether to use the output value of the ASR model for a voice assistant service based on a confidence level of the output value of the ASR model. The confidence level of the output value of the ASR model may represent, for example, a degree of matching between a text string output from the ASR model and the input speech.

When the device 1000 determines not to use the output value of its ASR model ("No" in operation 900), the device 1000 may provide the server 2000 with an encoder output value from the encoder in the ASR model of the device 1000. For example, the device 1000 may provide the server 2000 with a hidden vector output from a hidden layer in the encoder or graphemes generated from the hidden vector.

Thereafter, an ASR model 905 of the server 2000 may obtain its output value using the encoder output value received from the device 1000. The server 2000 may input the encoder output value received from the device 1000 to a decoder in the ASR model 905 of the server 2000. For example, the server 2000 may generate a text string from the encoder output value, as in operations S325 through S340 of FIG. 3. Furthermore, the server 2000 may provide the output value of the ASR model 905 thereof to an NLU model 910 installed thereon.

On the other hand, when the device 1000 determines to use the output value of its ASR model ("Yes" in operation 900), the device 1000 may determine whether to perform NLU processing at the device 1000 itself using the output value of its ASR model (operation 915). For example, the device 1000 may determine whether to perform NLU processing therein based on a domain confidence level for the output value of its ASR model. A domain confidence level may include, for example, a numerical value indicating how closely a text string is relevant to a particular domain. The device 1000 may calculate a domain confidence level indicating the degree of a relevance of the output value of its ASR model to a domain pre-registered for NLU processing and determine whether to perform the NLU processing at the device 1000 itself based on the domain confidence level calculated for the pre-registered domain. For example, the device 1000 may obtain, for each of a plurality of pre-registered domains, a confidence score indicating the degree of a relevance of the output value of the ASR model to a pre-registered domain and determine whether to perform NLU processing at the device 1000 itself based on the obtained confidence score. The device 1000 may identify a domain related to the output value of the ASR model based on a rule or obtain a domain confidence level related to the output value of the ASR model using an AI model trained for domain identification. Furthermore, for example, the AI model for domain identification may be a part of an NLU model or a model separate therefrom. Furthermore, for example, the domain confidence level for the output value of the ASR model may be calculated by the domain identification module 1450 of FIG. 14.

When the device 1000 determines not to perform the NLU processing therein using the output value of its ASR model ("No" in operation 915), the device 1000 may provide the output value of the ASR model to the server 2000. For example, when confidence levels for output values of the ASR model of the device 1000, which are related to pre-registered domains, are less than a preset threshold so it is determined that the output values of the ASR model are not related or slightly related to the pre-registered domains, the device 1000 may determine not to perform the NLU processing at the device 1000 itself The NLU model 910 of the server 2000 may perform NLU processing using, for example, at least one of the output value of the ASR model 905 of the server 2000 or the output value of the ASR model of the device 1000. In addition, the server 2000 may provide an NLU result value output from the NLU model 910 to the device 1000. The NLU result value is data representing a result of interpreting text, and may be, for example, data output from the NLU model 910. For example, the NLU result value may include intent and parameters. The intent is information determined by interpreting text using an NLU model, and may indicate, for example, a user's intention of an utterance. The intent may include information indicating a user's intention of utterance (hereinafter, referred to as "intent information"), as well as a numerical value corresponding to the intent information. A numerical value may indicate a probability that the text will be related to information indicating a particular intent. When a plurality of pieces of intent information are obtained as a result of interpreting text using an NLU model, a piece of intent information with a maximum numerical value corresponding to the intent information may be determined as the intent. Furthermore, the parameters may indicate detailed information related to the intent. The parameters are information related to the intent, and a plurality of types of parameters may correspond to a single intent.

On the other hand, when the device 1000 determines to perform the NLU processing therein using the output value of its ASR model ("Yes" in operation 915), the device 1000 may provide the output value of the ASR model to an NLU model 920 installed thereon. The NLU model 920 of the device 1000 may perform NLU processing using the output value of the ASR model of the device 1000.

The device 1000 may determine whether to register a domain with itself (operation 925). When the device 1000 registers a particular domain therewith and determines that an output value of its ASR model generated after the registration is related to the registered domain, the device 1000 may set (e.g., configure) the output value of the ASR model to be processed using the NLU model 920 of the device 1000 instead of transmitting the output value of the ASR model to the server 2000. For domain registration, for example, the device 1000 may evaluate an NLU result value received from the server 2000 and an NLU result value output from the NLU model 920 thereof and register a particular domain with itself based on a result of the evaluation. The device 1000 may compare intent and parameters in the NLU result value output from the NLU model 910 of the server 2000 with intent and parameters in the NLU result value output from the NLU model 920 of the device 1000 and then register a particular domain with itself based on a result of the comparison. For example, when the intent and parameters in the NLU result value output from the NLU model 920 of the device 1000 are substantially identical or similar to the intent and parameters in the NLU result value output from the NLU model 910 of the server 2000, the device 1000 may register a domain corresponding to the NLU model 920 therewith.

The device 1000 may display, on a screen of the device 1000, a graphical user interface (GUI) for evaluating the NLU result value output from the NLU model 910 of the server 2000 and the NLU result value output from the NLU model 920 of the device 1000 and then evaluate the NLU result value from the NLU model 910 and the NLU result value from the NLU model 920 based on a user input via the displayed GUI.

Figure 14:
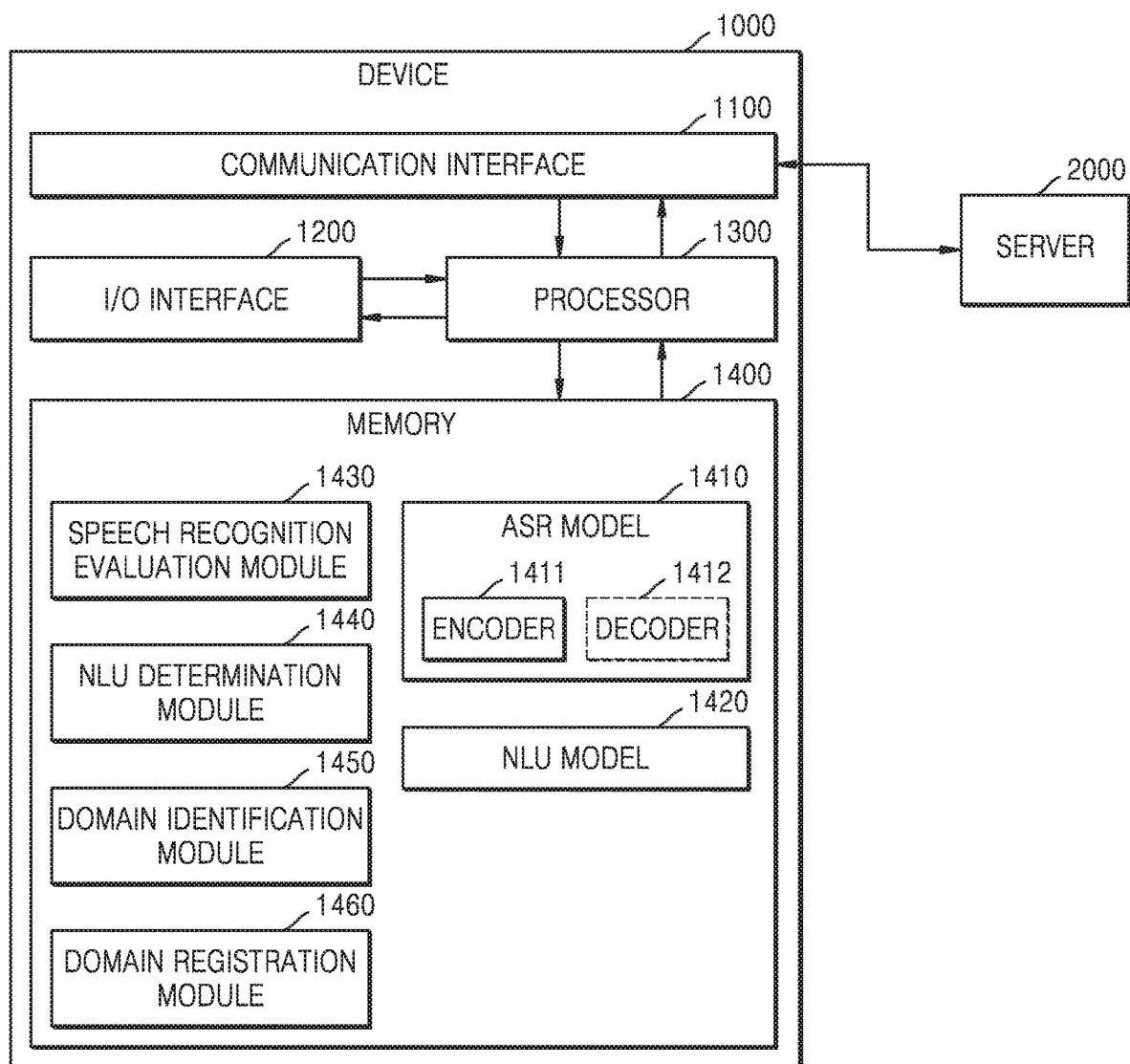
FIG. 14 is a block diagram illustrating an example configuration of an example device according to an embodiment of the disclosure.

As another example, the device 1000 may register a particular domain therewith using the domain registration module (e.g., 1460 of FIG. 14).

Figure 10:
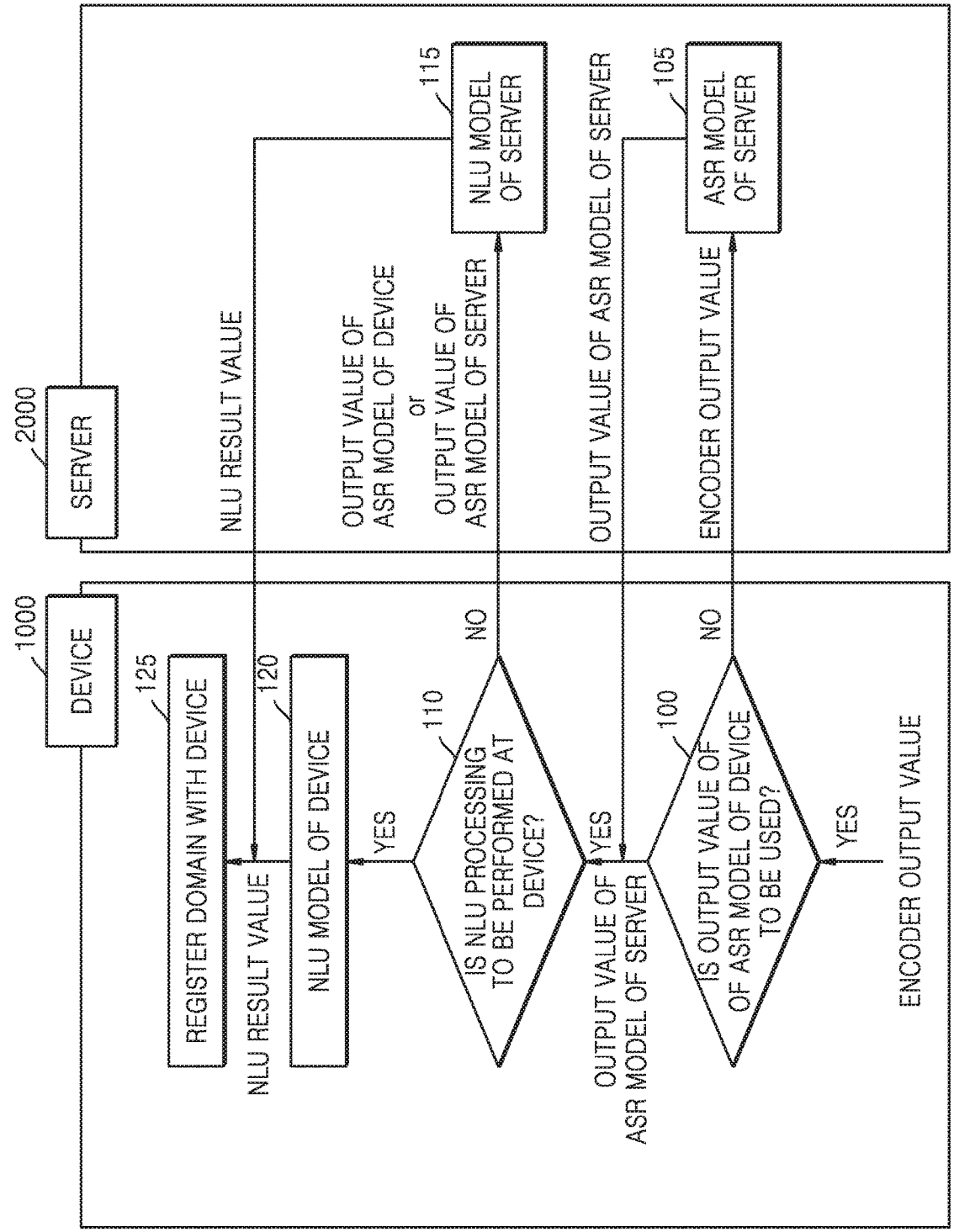
FIG. 10 is a flowchart illustrating an example method, performed by a device and a server, of performing speech recognition and NLU processing on a speech input, according to an embodiment of the disclosure.

FIG. 10 is a flowchart illustrating an example method, performed by the device 1000 and the server 2000, of performing speech recognition and NLU processing on a speech input, according to an embodiment of the disclosure.

Referring to FIG. 10, the device 1000 may determine whether to use an output value of its ASR model and determine whether to perform NLU processing at the device 1000 itself using an output value of an ASR model 105 of the server 2000.

The device 1000 may determine whether to use an output value of its ASR model based on an encoder output value from its ASR model (operation 100). The device 1000 may obtain a confidence level of the encoder output value and determine whether to use the output value of the ASR model by comparing the confidence level of the encoder output value with a preset threshold. When the confidence level of the encoder output value is greater than or equal to the preset threshold, the device 1000 may determine to use the output value of the ASR model. On the other hand, when the confidence level of the encoder output value is less than the preset threshold, the device 1000 may determine not to use the output value of the ASR model. The confidence level of the encoder output value may represent a degree of matching between text represented by the encoder output value and an input speech. Furthermore, for example, the confidence level of the encoder output value may be calculated using the speech recognition evaluation module (e.g., 1430 of FIG. 14).

The device 1000 may determine whether to use an output value of its ASR model based on the output value of the ASR model (operation 100). The device 1000 may determine whether to use the output value of the ASR model for a voice assistant service based on a confidence level of the output value of the ASR model. The confidence level of the output value of the ASR model may represent, for example, a degree of matching between a text string output from the ASR model and the input speech.

When the device 1000 determines not to use the output value of its ASR model ("No") in operation 100), the device 1000 may provide the server 2000 with an encoder output value from an encoder in the ASR model of the device 1000.

An ASR model 105 of the server 2000 may obtain its output value using the encoder output value received from the device 1000. The server 2000 may input the encoder output value received from the device 1000 to a decoder of the ASR model 105 of the server 2000. For example, the server 2000 may generate a text string from the encoder output value, as in operations S325 through S340 of FIG. 3. Furthermore, the server 2000 may provide the output value of the ASR model 105 thereof to the device 1000.

When the device 1000 determines to use the output value of its ASR model ("Yes" in operation 100), the device 1000 may determine whether to perform NLU processing at the device 1000 itself using the output value of its ASR model (operation 110). In this case, for example, the device 1000 may determine whether to perform NLU processing therein based on a domain confidence level for the output value of its ASR model. The device 1000 may identify a domain related to the output value of its ASR model based on a rule or obtain a domain confidence level related to the output value of the ASR model using an AI model trained for domain identification. Furthermore, for example, the AI model for domain identification may be a part of an NLU model or a model separate therefrom. For example, the domain confidence level for the output value of the ASR model of the device 1000 may be calculated by the domain identification module (e.g., 1450 of FIG. 14).

When the server 2000 provides the output value of the ASR model 105 thereof to the device 1000, the device 1000 may determine whether to perform NLU processing at the device 1000 itself using the output value of the ASR model 105 of the server 2000 (operation 110). For example, the device 1000 may determine whether to perform NLU processing therein based on a domain confidence level for the output value of the ASR model 105 of the server 2000. The device 1000 may calculate a domain confidence level indicating the degree of a relevance of the output value of the ASR model 105 of the server 2000 to a domain pre-registered for NLU processing and determine whether to perform the NLU processing at the device 1000 itself based on the domain confidence level calculated for the pre-registered domain. For example, the device 1000 may obtain, for each of a plurality of pre-registered domains, a confidence score indicating the degree of a relevance of the output value of the ASR model 105 of the server 2000 to a pre-registered domain and determine whether to perform NLU processing at the device 1000 itself based on the obtained confidence score. The device 1000 may identify a domain related to the output value of the ASR model 105 of the server 2000 based on a rule or obtain a domain confidence level related to the output value of the ASR model 105 using an AI model trained for domain identification. Furthermore, for example, the AI model for domain identification may be a part of an NLU model or a model separate therefrom. Furthermore, for example, the domain confidence level for the output value of the ASR model 105 of the server 2000 may be calculated by the domain identification module (e.g., 1450 of FIG. 14).

When the device 1000 determines to perform the NLU processing therein using the output value of its ASR model ("Yes" in operation 110), the device 1000 may provide the output value of its ASR model to an NLU model 120 of the device 1000. Furthermore, when the device 1000 determines to perform the NLU processing therein using the output value of the ASR model 105 of the server 2000, the device 1000 may provide the output value of the ASR model 105 of the server 2000 to the NLU model 120 of the device 1000. In this case, the NLU model 120 of the device 1000 may perform NLU processing using the output value of its ASR model or the output value of the ASR model 105 of the server 2000.

When the device 1000 determines not to perform the NLU processing therein using the output value of its ASR model ("No" in operation 110), the device 1000 may provide the output value of its ASR model to the server 2000. Furthermore, when the device 1000 determines not to perform the NLU processing therein using the output value of the ASR model 105 of the server 2000, the device 1000 may provide the output value of the ASR model 105 of the server 2000 to the server 2000.

An NLU model 115 of the server 2000 may perform NLU processing using at least one of the output value of the ASR model 105 of the server 2000 or the output value of the ASR model of the device 1000. Furthermore, the server 2000 may provide an NLU result value output from the NLU model 115 to the device 1000.

The device 1000 may determine whether to register a domain with itself (operation 125). When the device 1000 registers a particular domain therewith and determines that an output value of its ASR model generated after the registration is related to the registered domain, the device 1000 may set (e.g., configure) the output value of the ASR model to be processed using the NLU model 120 in the device 1000 instead of transmitting the output value of the ASR model to the server 2000.

Figure 11:
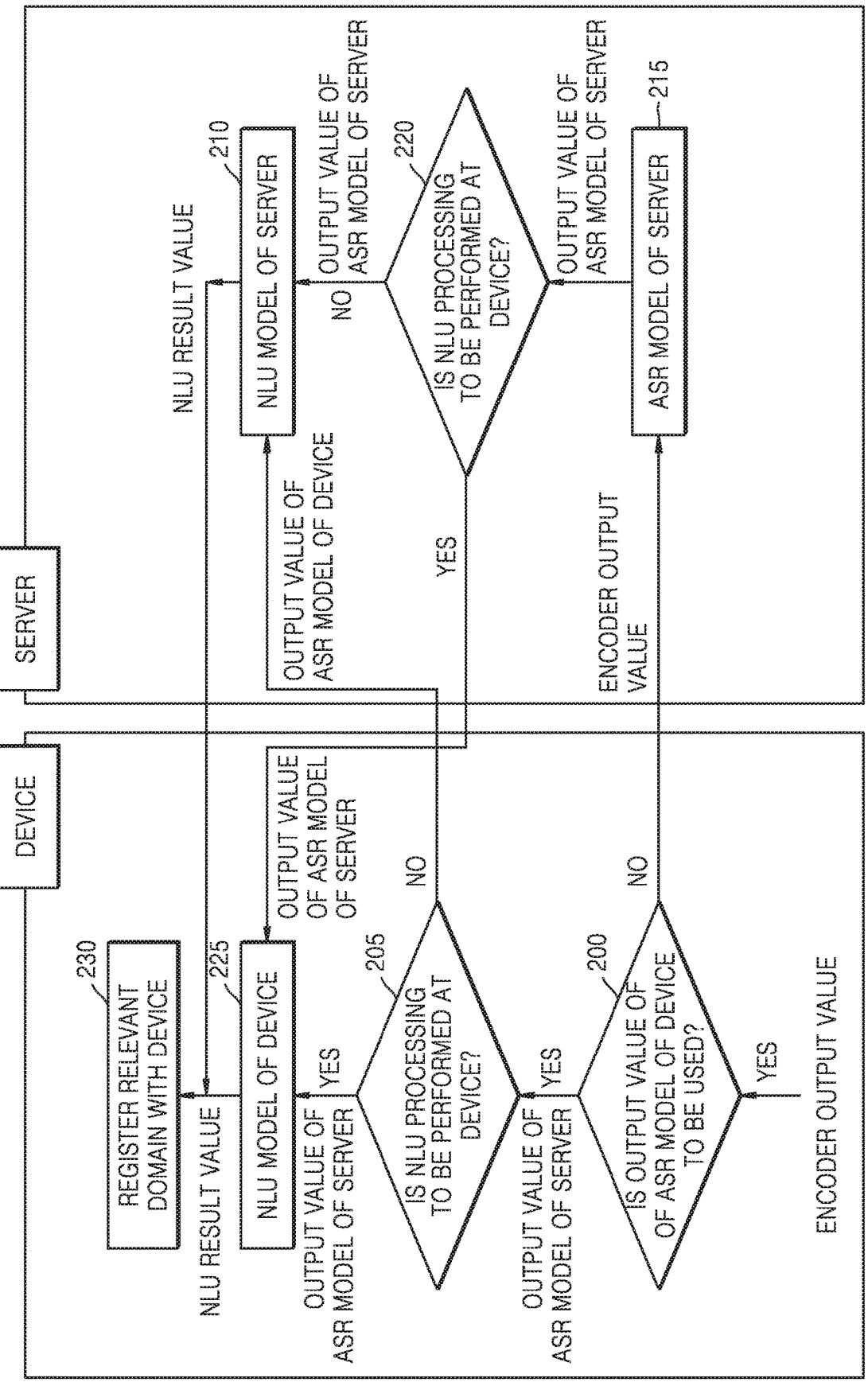
FIG. 11 is a flowchart illustrating an example method, performed by a device and a server, of performing speech recognition and NLU processing on a speech input, according to an embodiment of the disclosure.

FIG. 11 is a flowchart illustrating an example method, performed by the device 1000 and the server 2000, of performing speech recognition and NLU processing on a speech input, according to an embodiment of the disclosure.

Referring to FIG. 11, the device 1000 may determine whether to use an output value of its ASR model and whether to perform NLU processing at the device 1000 itself. Furthermore, the server 2000 may determine whether NLU processing is to be performed at the device 1000 based on an output value of an ASR model 215 of the server 2000.

The device 1000 may determine whether to use an output value of its ASR model based on an encoder output value from its ASR model (operation 200). The device 1000 may obtain a confidence level of the encoder output value and determine whether to use the output value of its ASR model by comparing the confidence level of the encoder output value with a preset threshold. When an output value is derived from the ASR model of the device 1000, the device 1000 may determine whether to use the output value of its ASR model based on the output value of its ASR model (operation 200).

When the device 1000 determines to use the output value of its ASR model ("Yes" in operation 200), the device 1000 may determine whether to perform NLU processing at the device 1000 itself using the output value of its ASR model (operation 205). For example, the device 1000 may determine whether to perform NLU processing therein based on a domain confidence level for the output value of its ASR model. The device 1000 may calculate a domain confidence level indicating the degree of a relevance of the output value of its ASR model to a domain pre-registered for NLU processing and determine whether to perform the NLU processing at the device 1000 itself based on the domain confidence level calculated for the pre-registered domain. The device 1000 may identify a domain related to the output value of its ASR model based on a rule or obtain a domain confidence level related to the output value of the ASR model using an AI model trained for domain identification. Furthermore, for example, the AI model for domain identification may be a part of an NLU model or a model separate therefrom. In addition, for example, the domain confidence level for the output value of the ASR model of the device 1000 may be calculated by the domain identification module (e.g., 1450 of FIG. 14).

When it is determined that the NLU processing is not to be performed at the device 1000 ("No" in operation 205), the device 1000 may provide the output value of its ASR model to the server 2000. The server 2000 may then input the output value of the ASR model of the device 1000 to an NLU model 210 of the server 2000 and obtain an NLU result value from the NLU model 210. Furthermore, the server 2000 may provide the NLU result value obtained from the NLU model 210 to the device 1000.

When it is determined that the NLU processing is be performed at the device 1000 ("Yes" in operation 205), the device 1000 may input the output value of its ASR model to an NLU model 225 of the device 1000 and obtain an NLU result value from the NLU model 225.

When the device 1000 determines not to use the output value of its ASR model ("No" in operation 200), the device 1000 may provide the server 2000 with an encoder output value from an encoder in the ASR model of the device 1000.

The ASR model 215 of the server 2000 may obtain its output value using the encoder output value received from the device 1000. The server 2000 may input the encoder output value received from the device 1000 to a decoder in the ASR model 215 of the server 2000 and obtain an output value from the ASR model 215. For example, the server 2000 may generate a text string from the encoder output value, as in operations S325 through S340 of FIG. 3.

The server 2000 may then determine whether NLU processing is to be performed at the device 1000 based on the output value of the ASR model 215 (operation 220). The server 2000 may determine whether a domain related to the output value of the ASR model 215 is a domain in which the device 1000 is able to perform NLU processing. When the domain related to the output value of the ASR model 215 is a domain pre-registered with the device 1000, the server 2000 may determine that the device 1000 is to perform NLU processing ("Yes" in operation 220). On the other hand, when the domain related to the output value of the ASR model 215 is not a domain pre-registered with the device 1000, the server 2000 may determine that the device 1000 is not to perform NLU processing ("No" in operation 220).

For example, the server 2000 may determine whether NLU processing is to be performed at the device 1000 based on a domain confidence level for the output value of the ASR model 215. The server 2000 may calculate a domain confidence level indicating the degree of a relevance of the output value of the ASR model 215 to a domain pre-registered with the device 1000 for NLU processing and determine whether the NLU processing is to be performed at the device 1000 based on the domain confidence level calculated for the pre-registered domain. For example, the server 2000 may obtain, for each of a plurality of pre-registered domains, a confidence score indicating the degree of a relevance of the output value of the ASR model 215 of the server 2000 to a pre-registered domain and determine whether NLU processing is to be performed at the device 1000 based on the obtained confidence score. In this case, information indicating which domain is registered with the device 1000 may be prestored in the server 2000. Information indicating which domain is registered with the device 1000 may be provided from the device 1000 to the server 2000 in response to a request by the server 2000. The server 1000 may identify a domain related to the output value of the ASR model 215 based on a rule or obtain a domain confidence level related to the output value of the ASR model 215 using an AI model trained for domain identification. Furthermore, for example, the AI model for domain identification may be a part of an NLU model or a model separate therefrom. Furthermore, for example, the domain confidence level for the output value of the ASR model 215 of the server 2000 may be calculated by a speech recognition evaluation module (e.g., 2341 of FIG. 13).

When the server 2000 determines that the device 1000 is to perform NLU processing ("Yes" in operation 220), the server 2000 may provide the output value of the ASR model 215 to the device 1000. The device 1000 may then input the output value of the ASR model 215 of the server 2000 to the NLU model 225 of the device 1000 and obtain an NLU result value from the NLU model 225.

When the server 2000 determines that the device 1000 is not to perform the NLU processing ("No" in operation 220), the server 2000 may provide the output value of the ASR model 215 to the NLU model 210. The server 2000 may then input the output value of the ASR model 215 to the NLU model 210 and obtain an NLU result value from the NLU model 210. Furthermore, the server 2000 may provide the obtained NLU result value to the device 1000.

The device 1000 may determine whether to register a domain with itself (operation 230). When the device 1000 registers a particular domain therewith and determines that an output value of its ASR model, which is generated after the registration, is related to the registered domain, the device 1000 may set (e.g., configure) the output value of the ASR model to be processed using the NLU model 225 thereof instead of transmitting the output value of the ASR model to the server 2000.

Figure 12:
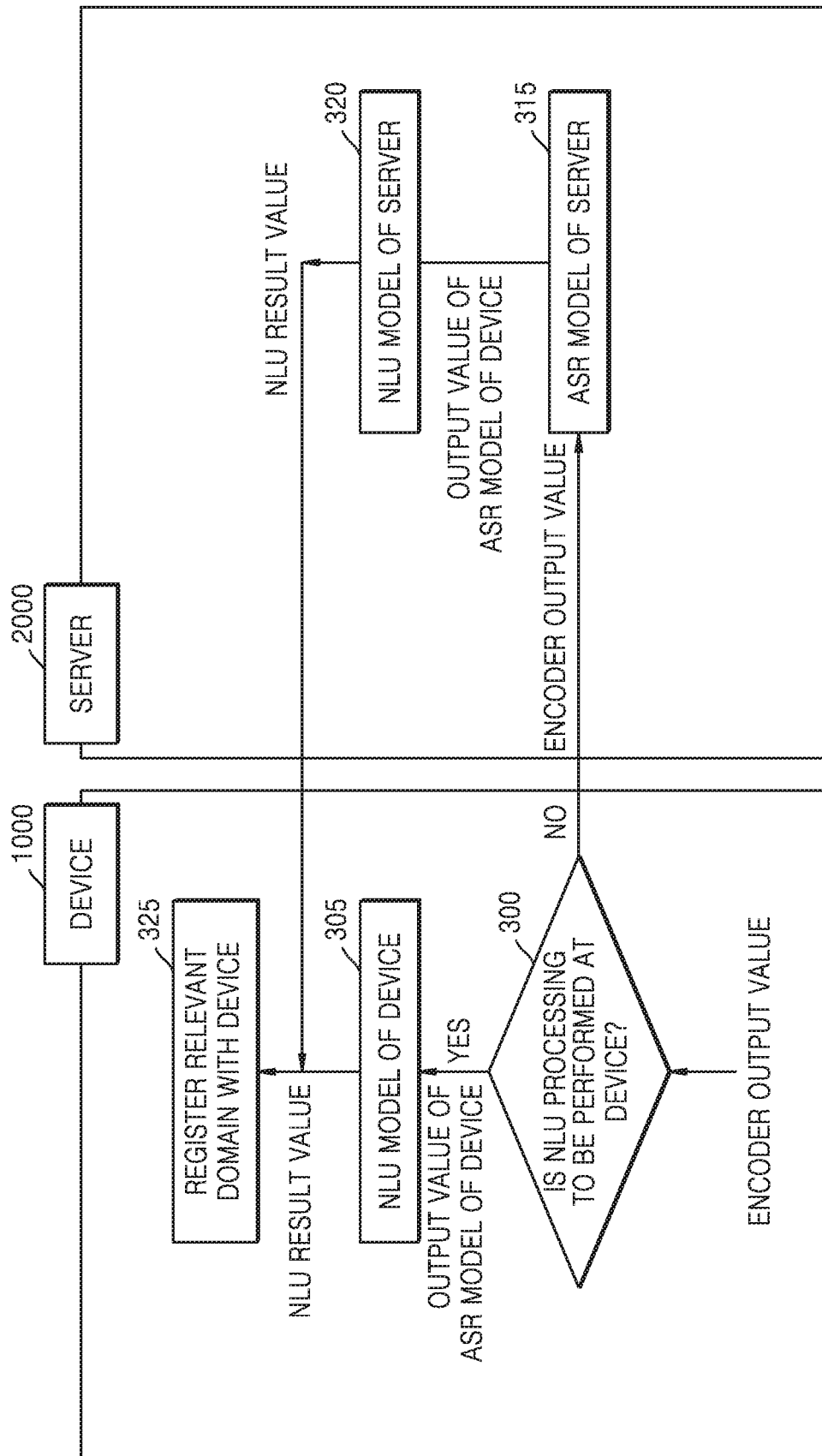
FIG. 12 is a flowchart illustrating an example method, performed by a device and a server, of performing speech recognition and NLU processing on a speech input, according to an embodiment of the disclosure.

FIG. 12 is a flowchart illustrating an example method, performed by the device 1000 and the server 2000, of performing speech recognition and NLU processing on a speech input, according to an embodiment of the disclosure. Referring to FIG. 12, the device 1000 may immediately determine whether to perform NLU processing therein.

When an output value is derived from an ASR model of the device 1000, the device 1000 may determine whether to perform NLU processing at the device 1000 itself based on the output value of its ASR model (operation 300). The device 1000 may determine whether to perform NLU processing at the device 1000 itself based on at least one of a confidence level of the output value of its ASR model or a domain confidence level for its ASR model. For example, the confidence level of the output value of the ASR model may include a confidence score indicating the degree of matching between a text string output from the ASR model and an input speech. Furthermore, the domain confidence level may include, for example, a confidence score indicating the degree of a relevance of a text string output from the ASR model to a particular domain.

In addition, the device 1000 may determine whether to perform the NLU processing therein based on a weighted sum of the confidence level of the output value of its ASR model and the domain confidence level for its ASR model. For example, the device 1000 may apply a first weight to the confidence level of the output value of the ASR model, apply a second weight to the domain confidence level for the ASR model, and determine whether to perform NLU processing at the device 1000 itself based on the confidence level weighted by the first weight and the domain confidence level weighted by the second weight. In this case, the confidence level of the output value of the ASR model and the domain confidence level for the ASR model may be values normalized according to a preset criterion. Furthermore, for example, the weighted sum of the confidence level of the output value of the ASR model and the domain confidence level for the ASR model may be calculated by the speech recognition evaluation module (e.g., 1430 of FIG. 14).

When it is determined that the NLU processing is to be performed at the device 1000 ("Yes" in operation 300), the device 1000 may input an output value of its ASR model to an NLU model 305 thereof and obtain an NLU result value output from the NLU model 305.

When it is determined that the NLU processing is not be performed at the device 1000 ("No" in operation 300), the device 1000 may provide the server 2000 with an encoder output value from an encoder in the ASR model of the device 1000. The server 2000 may input the encoder output value to an ASR model 315 thereof and input an output value of the ASR model 315 to an NLU model 320 of the server 2000. The server 2000 may obtain an NLU result value output from the NLU model 320 and provide it to the device 1000.

The device 1000 may determine whether to register a domain with itself (operation 325). When the device 1000 registers a particular domain therewith and determines that an output value of its ASR model generated after the registration is related to the registered domain, the device 1000 may set (e.g., configure) the output value of the ASR model to be processed using the NLU model 305.

Figure 13:
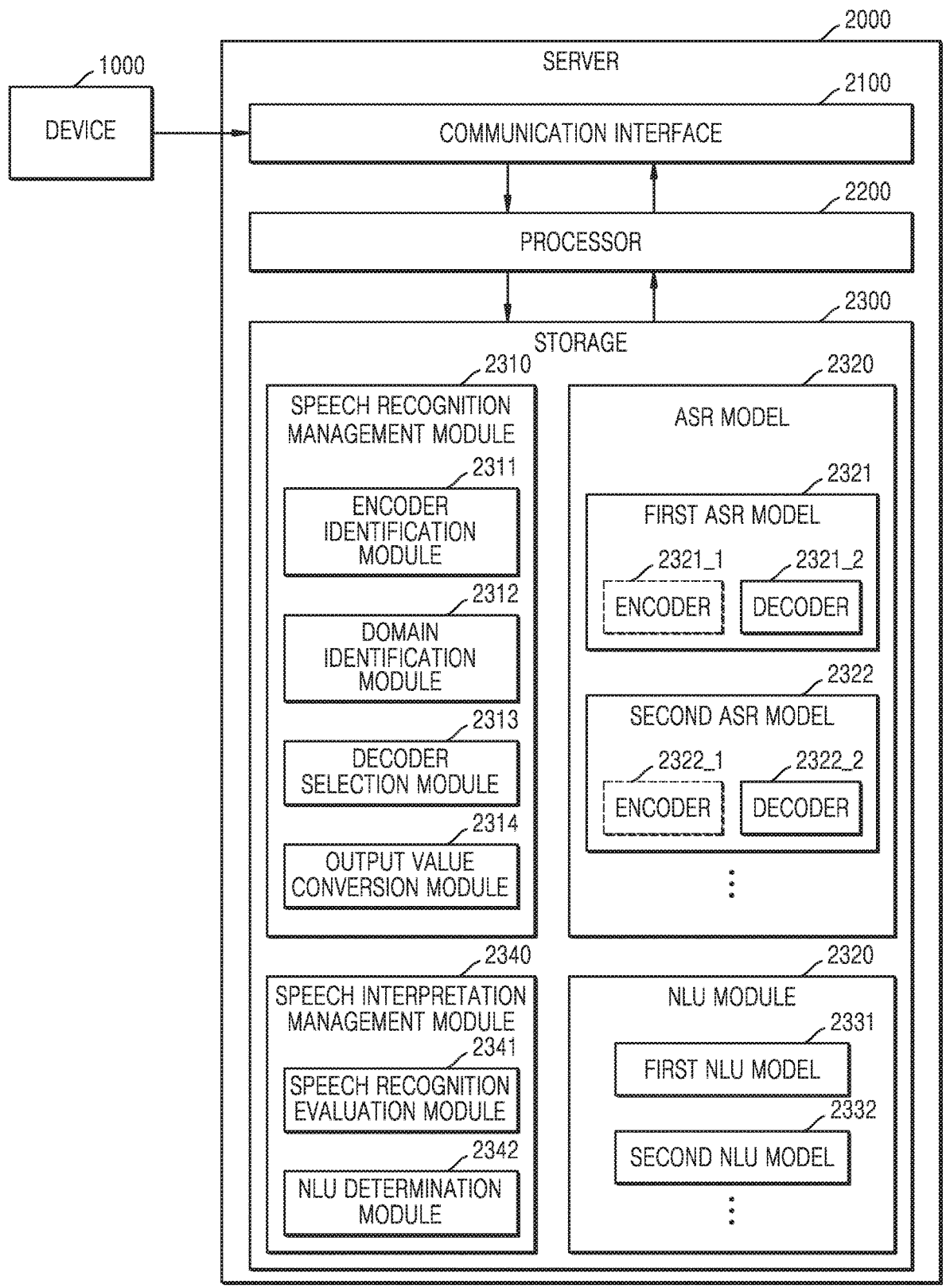
FIG. 13 is a block diagram illustrating an example server according to an embodiment of the disclosure.

FIG. 13 is a block diagram illustrating an example server 2000 according to an embodiment of the disclosure.

Referring to FIG. 13, according to an embodiment of the disclosure, the server 2000 may include a communication interface (e.g., including communication circuitry) 2100, a processor (e.g., including processing circuitry) 2200, and a storage 2300, and the storage 2300 may include a speech recognition management module (e.g., including executable program elements) 2310, an ASR module (e.g., including executable program elements) 2320, an NLU module (e.g., including executable program elements) 2330, and a speech interpretation management module (e.g., including executable program elements) 2340.

The communication interface 2100 may include one or more components (e.g., circuitry) for performing communication with the device 1000 and other servers (not shown). The communication interface 2100 may exchange information for speech recognition and voice assistant services with the device 1000 and the other servers. For example, the communication interface 2100 may perform communication via a local area network (LAN), a wide area network (WAN), a value added network (VAN), a mobile radio communication network, a satellite communication network, or combinations thereof, but is not limited thereto.

The processor 2200 may include various processing circuitry and controls all operations of the server 2000. The processor 2200 may execute programs stored in the storage 2300 to control all operations of the server 2000 presented in the disclosure.

The storage 2300 may store programs necessary for processing or control operations performed by the processor 2200 or store data input to or output from the server 2000. For example, the storage 2300 may include at least one of types of storage media, e.g., a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc, but is not limited thereto.

Programs stored in the storage 2300 may be classified into a plurality of modules according to their functions, such as, for example, the speech interpretation management module 2340, the ASR module 2320, and the NLU module 2330.

The speech recognition management module 2310 may include various executable program elements including various modules and provides an encoder output value received from the device 1000 to the ASR model 2320. The speech recognition management module 2310 may include an encoder identification module 2311, a domain identification module 2312, a decoder selection module 2313, and an output value conversion module 2314.

The domain identification module 2312 may identify a domain related to an encoder output value received from the device 1000. When the server 2000 receives domain information from the device 1000, the domain identification module 2312 may identify a domain related to an encoder output value based on the domain information. Furthermore, when the server 2000 does not receive domain information from the device 1000, the domain identification module 2312 may identify a domain related to an encoder output value based on the encoder output value. For example, the server 2000 may receive, from the device 1000, text obtained from a projection layer connected to an output terminal of an encoder in the device 1000, and the domain identification module 2312 may identify a domain related to an encoder output value using the received text. As another example, the domain identification module 2312 may obtain text by applying a projection layer to an encoder output value based on encoding information received from the device 1000 and identify a domain related to the encoder output value using the obtained text. In this case, the domain identification module 2312 may identify a domain related to the encoder output value based on a domain confidence level for the text generated from the encoder output value. For example, the domain identification module 2312 may calculate a confidence score indicating the degree of a relevance of text obtained from an encoder output value to a domain pre-registered to decode the encoder output value. Furthermore, the domain identification module 2312 may identify a domain related to the encoder output value based on a domain confidence level calculated for the pre-registered domain. The domain identification module 2312 may identify a domain related to an encoder output value by analyzing the encoder output value and a format of the encoder output value and applying a projection layer to the encoder output value based on a result of the analysis.

The encoder identification module 2311 may identify a type of an encoder in the device 1000 and degree of encoding related to an encoder output value. When the server 2000 receives encoding information from the device 1000, the encoder identification module 2311 may identify a type of an encoder that outputs an encoder output value and a degree of encoding based on the encoding information. When the server 2000 does not receive encoding information from the device 1000, the server 2000 may identify a type of an encoder and a degree of encoding by analyzing an encoder output value and a format of the encoder output value.

The decoder selection module 2313 may select a decoder to decode an encoder output value. The decoder selection module 2313 may select a decoder to decode the encoder output value based on at least one of a domain identified by the domain identification module 2312, a type of an encoder, or encoding information, wherein the type of the encoder and the encoding information are identified by the encoder identification module 2311. The decoder selection module 2313 may select at least some of a plurality of decoders in the server 2000 according to a preset criterion.

The decoder selection module 2313 may select one decoder corresponding to a particular domain. The decoder selection module 2313 may select, for example, one decoder of the same type as an encoder output value from among a plurality of decoders corresponding to a domain related to an encoder output value.

The decoder selection module 2313 may select a plurality of decoders corresponding to a particular domain. The decoder selection module 2313 may select, for example, a plurality of decoders corresponding to one domain related to an encoder output value. The selected decoders may include a decoder of the same type as the encoder output value and a decoder of a different type.

The decoder selection module 2313 may select a plurality of decoders corresponding to a plurality of domains. For example, the decoder selection module 2313 may select a plurality of decoders corresponding to a plurality of domains related to an encoder output value. The selected decoders may include a decoder of the same type as and a decoder of a different type than the encoder output value. The decoder selection module 2313 may select all decoders in the server 2000.

When a decoder of the same type as an encoder in the device 1000 is not in the server 2000, the decoder selection module 2313 may select a decoder of a different type than an encoder output value to process the encoder output value.

The output value conversion module 2314 may convert a format of an encoder output value according to a selected decoder. When the format of the encoder output value is different from a format of an input value to be fed into the selected decoder, the output value conversion module 2314 may convert the format of the encoder output value received from the device 1000. In this case, the output value conversion module 2314 may convert the format of the encoder output value using a tool for converting the encoder output value into a format compatible with the selected decoder. In this case, to allow encoder output values of various formats to be fed into various types of decoders, the server 2000 may store conversion tools corresponding to each of combinations of a plurality of types of encoders and a plurality of types of decoders.

The ASR module 2320 may obtain a text string by decoding an encoder output value received from the device 1000. The ASR module 2320 may include a plurality of ASR models corresponding to a plurality of domains, such as a first ASR model 2321, a second ASR model 2322, etc. The first ASR model 2321 and the second ASR model 2322 may include end-to-end ASR models. The first ASR model 2321 may include an encoder 2321-1 and a decoder 2321-2, and the second ASR model 2322 may include an encoder 2322-1 and a decoder 2322-2. Alternatively, according to an embodiment of the disclosure, the encoder 2321-1 may not be included in the first ASR model 2321, and the encoder 2322-1 may not be included in the second ASR model 2322.

The NLU module 2330 may interpret a text string output from the ASR module 2320. The NLU module 2330 may include a plurality of NLU models corresponding to a plurality of domains, such as a first NLU model 2331, a second NLU model 2332, etc. Furthermore, when the device 1000 provides an output value of an ASR model therein to the server 2000, the NLU module 2330 may interpret the output value of the ASR model, which is received from the device 1000.

The speech interpretation management module 2340 may evaluate a speech recognition result obtained from the ASR module 2320 of the server 2000 and determine whether to perform NLU processing on the speech recognition result. The speech interpretation management module 2340 may include a speech recognition evaluation module 2341 and an NLU determination module 2342.

The speech recognition evaluation module 2341 may calculate a confidence level of a text string generated based on an output value of a decoder in the server 2000. When a plurality of decoders are selected and a plurality of text strings are generated using the selected decoders, the speech recognition evaluation module 2341 may compare confidence levels of the text strings with one another and select a text string having a high confidence level as a text string to be provided to the device 1000. A confidence level of a text string may be a numerical value indicating the degree of matching between the text string and an input speech, and the confidence level may include, for example, a confidence score, but is not limited thereto. The speech recognition evaluation module 2341 may calculate a domain confidence level for a text string generated based on an output value of a decoder. The speech recognition evaluation module 2341 may calculate a domain confidence level indicating the degree of a relevance of an output value of an ASR model of the server 2000 to a domain pre-registered with the device 1000 for NLU processing and determine whether NLU processing is to be performed at the device 1000 based on the domain confidence level calculated for the pre-registered domain. For example, the speech recognition evaluation module 2341 may obtain, for each of a plurality of domains pre-registered with the device 1000, a confidence score indicating the degree of a relevance of an output value of an ASR model of the server 2000 to a pre-registered domain and determine whether NLU processing is to be performed at the device 1000 based on the obtained confidence score. In this case, information indicating which domain is registered with the device 1000 may be prestored in the server 2000. Alternatively, information indicating which domain is registered in the device 1000 may be provided from the device 1000 to the server 2000 in response to a request by the server 2000.

The NLU determination module 2342 may determine whether NLU processing is to be performed at the device 1000 or the server 2000 with respect to a speech recognition result from the ASR module 2320 in the server 2000. The NLU determination module 2342 may determine whether a domain related to an output value of the ASR module 2320 is a domain in which the device 1000 is able to perform NLU processing. When the domain related to the output value of the ASR module 2320 is a domain pre-registered with the device 1000, the NLU determination module 2342 may determine that the device 1000 is to perform NLU processing. When the domain related to the output value of the ASR module 2320 is not a domain pre-registered with the device 1000, the NLU determination module 2342 may determine that the device 1000 is not to perform NLU processing. In this case, the server 2000 may receive a list of domains pre-registered with the device 1000 from the device 1000 and store the list in the storage 2300.

FIG. 14 is a block diagram illustrating an example configuration of device 1000 according to an embodiment of the disclosure.

Referring to FIG. 14, according to an embodiment of the disclosure, the device 1000 may include a communication interface (e.g., including communication circuitry) 1100, an input/output (I/O) interface (e.g., including I/O circuitry) 1200, a processor (e.g., including processing circuitry) 1300, and a memory 1400, and the memory 1400 may include an ASR model 1410, an NLU model 1420, a speech recognition evaluation module 1430, an NLU determination module 1440, a domain identification module 1450, and a domain registration module 1460.

The communication interface 1100 may include one or more components (e.g., circuitry) for performing communication with the server 2000 and external devices (not shown). The communication interface 1100 may exchange information for speech recognition and voice assistant services with the server 2000 and the external devices. For example, the communication interface 1100 may perform communication via a LAN, a WAN, a VAN, a mobile radio communication network, a satellite communication network, or combinations thereof, but is not limited thereto.

The I/O interface 1200 may include various I/O circuitry and receive data input to the device 1000 and output data from the device 1000. The I/O interface 1200 may include, for example, and without limitation, a user input interface, a camera, a microphone, a display, an audio output interface, or the like. Examples of the user input interface may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, etc.

The display may display and output information processed by the device 1000. For example, the display may display a GUI for voice assistant services. When the display and a touch pad form a layer structure to construct a touch screen, the display may be used as an input device as well as an output device. The display may include, for example, and without limitation, at least one of a liquid crystal display (LCD), a thin-film transistor-LCD (TFT-LCD), an organic light-emitting diode (OLED) display, a flexible display, a three-dimensional (3D) display, an electrophoretic display, or the like.

The audio output interface may output audio data and may include, for example, a speaker, a buzzer, etc.

The camera may obtain an image frame such as a still or moving image via an image sensor in a video call mode or image-capturing mode. An image captured via the image sensor may be processed by the processor 1300 or a separate image processor (not shown).

The microphone may receive a user's utterance and process the user's utterance as electrical speech data.

The processor 1300 may include various processing circuitry and controls all operations of the device 1000. The processor 1300 may execute programs stored in the memory 1400 to control all operations of the device 1000 presented in the disclosure.

The memory 1400 may store programs necessary for processing or control operations performed by the processor 1300 or store data input to or output from the device 1000. For example, the memory 1400 may include at least one of types of storage media, e.g., a flash memory-type memory, a hard disk-type memory, a multimedia card micro-type memory, a card-type memory (e.g., an SD card or an XD memory), RAM, SRAM, ROM, EEPROM, PROM, a magnetic memory, a magnetic disc, or an optical disc, but is not limited thereto.

Programs stored in the memory 1400 may be classified into a plurality of modules according to their functions, such as the ASR model 1410, the NLU model 1420, the speech recognition evaluation module 1430, the NLU determination module 1440, the domain identification module 1450, and the domain registration module 1460.

The ASR model 1410 may encode a speech signal input to the device 1000. The ASR model 1410 may be an end-to-end ASR model and include an encoder 1411 and a decoder 1412. The speech signal input to the device 1000 may be encoded by the encoder 1411 in the ASR model 1410. The encoder 1411 in the ASR model 1410 may include a plurality of layers, e.g., a plurality of stacked LSTM layers. Furthermore, an encoded output value may be one of output values derived from the layers in the encoder 1411. The encoded output value may be a hidden vector output from a layer in the encoder 1411.

The ASR model 1410 may generate a text string from a speech signal using the encoder 1411 and the decoder 1422.

The NLU model 1420 may interpret a text string output from the ASR model 1410. The NLU model 1420 may interpret a text string provided from an ASR model in the server 2000. When the server 2000 provides an output value of an ASR model therein to the device 1000, the NLU model 1420 may interpret the output value of the ASR model, which is provided by the server 2000.

The speech recognition evaluation module 1430 may evaluate an output value of the encoder 1411 and an output value of the ASR model 1410. The speech recognition evaluation module 1430 may obtain a confidence level of the output value of the encoder 1411. A confidence level of an encoded output value may include, for example, a numerical value indicating a degree of matching between the encoded output value and an input speech, and the confidence level may include, for example, a confidence score, but is not limited thereto. The confidence level of the encoded output value may represent a degree of matching between text represented by the encoded output value and the input speech. For example, when the encoder 1411 of the ASR model 1410 in the device 1000 is trained, a CTC loss function may be used. In this case, by connecting a projection layer to an output terminal of the encoder 1411, text may be obtained from the projection layer. Furthermore, the speech recognition evaluation module 1430 may calculate a confidence level of an encoder output value based on the text obtained from the projection layer connected to the output terminal of the encoder. However, a method of calculating a confidence level is not limited thereto, and for example, the speech recognition evaluation module 1430 may calculate a confidence level directly from an encoder output value using a preset algorithm.

Encoder output values may be respectively derived from the layers in the encoder 1411, and the speech recognition evaluation module 1430 may calculate a confidence level of each of the derived encoder output values. Furthermore, it may be determined, based on a confidence level calculated by the speech recognition evaluation module 1430, whether to provide an encoder output value to the server 2000.

Furthermore, the speech recognition evaluation module 1430 may calculate a confidence level of a text string output from the ASR model 1410. A confidence level of a text string may be a numerical value indicating the degree of matching between the text string and an input speech, and the confidence level may include, for example, a confidence score, but is not limited thereto. It may be determined, based on a confidence level calculated by the speech recognition evaluation module 1430, whether the device 1000 is to use an output value of the ASR model 1410 thereof.

The NLU determination module 1440 may determine whether NLU processing is to be performed on a text string output from the ASR model 1410 at the device 1000 or the server 2000. The NLU determination module 1440 may determine whether a domain related to an output value of the ASR model 1410 is a domain in which the device 1000 is able to perform NLU processing. When the domain related to the output value of the ASR model 1410 is a domain pre-registered with the device 1000, the NLU determination module 1440 may determine that the device 1000 is to perform NLU processing. On the other hand, when the domain related to the output value of the ASR model 1410 is not a domain pre-registered with the device 1000, the NLU determination module 1440 may determine that the device 1000 is not to perform NLU processing.

The domain identification module 1450 may identify a domain related to an encoder output value derived from the encoder 1411. The domain identification module 1450 may identify a domain related to an encoder output value based on the encoder output value. For example, the domain identification module 1450 may obtain text from a projection layer connected to an output terminal of an encoder in the device 1000 and identify a domain related to an encoder output value using the obtained text. The domain identification module 1450 may identify a domain related to an encoder output value based on a domain confidence level for text generated from the encoder output value. For example, the domain identification module 1405 may calculate a confidence score indicating the degree of a relevance of text obtained from an encoder output value to a preset domain. Furthermore, the domain identification module 1450 may identify a domain related to the encoder output value based on a domain confidence level calculated for the preset domain.

Furthermore, the domain identification module 1450 may calculate a domain confidence level for an output value of the ASR model 1410 in the device 1000. The domain identification module 1450 may calculate a domain confidence level indicating the degree of a relevance of the output value of the ASR model 1410 in the device 1000 to a domain pre-registered for NLU processing. For example, the domain identification module 1450 may obtain, for each of a plurality of pre-registered domains, a confidence score indicating the degree of a relevance of an output value of the ASR model 1410 in the device 1000 to a pre-registered domain.

The domain identification module 1450 may calculate a domain confidence level for an output value of an ASR model in the server 2000. The domain identification module 1450 may calculate a domain confidence level indicating the degree of a relevance of the output value of the ASR model in the server 2000 to a domain pre-registered for NLU processing. For example, the domain identification module 1450 may obtain, for each of a plurality of pre-registered domains, a confidence score indicating the degree of a relevance of an output value of an ASR model in the server 2000 to a pre-registered domain.

The domain registration module 1460 may register a domain with the device 1000. When a particular domain is registered with the device 1000 and it is determined that an encoder output value generated after the registration is related to the registered domain, the encoder output value generated after the registration may be processed using a decoder in the device 1000 without being transmitted to the server 2000.

For example, the domain registration module 1460 may register a particular domain with the device 1000 based on a result of evaluating an encoder output value. As another example, the domain registration module 1460 may register a particular domain with the device 1000 based on a result of evaluating a text string output from the ASR model 1410. As another example, the domain registration module 1460 may register, based on a result of evaluating a text string received from the server 2000, a domain related to the evaluated text string with the device 1000.

According to the disclosure, functions related to AI may operate via a processor and a memory. The processor may be configured as one or a plurality of processors. In this case, the one or plurality of processors may include a general-purpose processor such as, for example, and without limitation, a central processing unit (CPU), a dedicated processor, an application processor (AP), a digital signal processor (DSP), a dedicated graphics processor such as a graphical processing unit (GPU), a vision processing unit (VPU), a dedicated AI processor such as a neural processing unit (NPU). The one or plurality of processors may control input data to be processed according to predefined operation rules or an AI model stored in the memory. When the one or more processors are a dedicated AI processor, the dedicated AI processor may be designed with a hardware structure specialized for processing a particular AI model.

The predefined operation rules or AI model may be created via a training process. The creation via the training process may refer to the predefined operation rules or AI model being set (e.g., configured) to perform desired characteristics (or purpose) are created by training a basic AI model based on a large number of training data via a learning algorithm. The training process may be performed by an apparatus itself in which AI is performed or via a separate server and/or system. Examples of a learning algorithm may include, but are not limited to, supervised learning, unsupervised learning, semi-supervised learning, and reinforcement learning.

An AI model may include a plurality of neural network layers. Each of the neural network layers has a plurality of weight values and may perform neural network computations via calculations between a result of computations in a previous layer and a plurality of weight values. A plurality of weight values assigned to each of the neural network layers may be optimized based on a result of training the AI model. For example, a plurality of weight values may be modified to reduce or minimize a loss or cost value obtained by the AI model during a training process. An artificial neural network may include a deep neural network (DNN) and may include, for example, and without limitation, a convolutional neural network (CNN), a DNN, an RNN, a restricted Boltzmann machine (RBM), a deep belief network (DBN), a bidirectional recurrent DNN (BRDNN), deep Q-networks (DQN), or the like, but is not limited thereto.

Embodiments of the disclosure may be implemented through computer-readable recording media having recorded thereon computer-executable instructions such as program modules that are executed by a computer. The computer-readable recording media may be any available media that can be accessed by a computer and include both volatile and nonvolatile media and both detachable and non-detachable media. Furthermore, the computer-readable recording media may include computer storage media and communication media. The computer storage media include both volatile and nonvolatile media and both detachable and non-detachable media implemented by any method or technique for storing information such as computer-readable instructions, data structures, program modules, or other data. Communication media typically embody computer-readable instructions, data structures, program modules, or other data in a modulated data signal.

Furthermore, in the disclosure, the term "unit" may include a hardware component such as a processor or circuit and/or a software component that is executed by a hardware component such as a processor.

The above description of the disclosure is provided for illustration, and it will be understood by those of ordinary skill in the art that various changes in form and details may be readily made without departing from the technical spirit or essential features of the disclosure, including the following claims. Accordingly, the above-described embodiments of the disclosure and all aspects thereof are examples only and are not limiting. For example, each component defined as an integrated component may be implemented in a distributed fashion. Likewise, components defined as separate components may be implemented in an integrated form.

The scope of the disclosure is defined not by the detailed description thereof and includes the appended claims, and all the changes or modifications within the meaning and scope of the appended claims and their equivalents will be understood as being included in the scope of the disclosure.

What is claimed is:

1. A method, performed by a server, of providing a text string for a speech signal input to a device, the method comprising:
    receiving, from the device, an encoder output value derived from an encoder of an end-to-end automatic speech recognition (ASR) model included in the device;
    identifying a domain corresponding to the received encoder output value;
    selecting a decoder corresponding to the identified domain from among a plurality of decoders of an end-to-end ASR model included in the server;
    obtaining a text string from the received encoder output value using the selected decoder; and
    providing the obtained text string to the device,
    wherein the encoder output value is derived by the device by encoding the speech signal input to the device.

2. The method of claim 1, wherein the identifying of the domain comprises identifying the domain based on at least one of the encoder output value or domain information received from the device.

3. The method of claim 1, wherein the plurality of decoders respectively correspond to a plurality of domains, and
    wherein the selecting of the decoder comprises selecting the decoder corresponding to the identified domain from among the plurality of decoders corresponding to the plurality of domains.

4. The method of claim 1, wherein the server includes a plurality of decoders corresponding to a plurality of types of end-to-end ASR models,
    wherein the method further comprises:
    receiving an identification value of the encoder from the device, and
    wherein the selecting of the decoder comprises selecting the decoder corresponding to the encoder included in the device based on the identification value of the encoder.

5. The method of claim 1, further comprising determining whether to provide the encoder output value from the device to the server based on a confidence level of the encoder output value.

6. The method of claim 1, wherein the encoder includes a plurality of stacked long short-term memory (LSTM) layers, and
    the encoder output value is derived from an LSTM layer selected from among the plurality of stacked LSTM layers.

7. The method of claim 6, wherein the encoder output value includes a hidden layer vector sequence output from the selected LSTM layer.

8. The method of claim 7, wherein the identifying a domain comprises obtaining text from the encoder output value and identifying the domain related to the text.

9. The method of claim 1, further comprising determining whether to interpret the obtained text string using a natural language understanding (NLU) model of the server, and
    wherein the providing of the text string comprises providing the text string to the device based on determining that the text string is not to be interpreted using the NLU model of the server.

10. The method of claim 9, further comprising:
    inputting the text string to the NLU model of the server based on determining that the text string is to be interpreted using the NLU model of the server; and
    providing the device with a voice assistant service based on data output from the NLU model of the server.

11. A server configured to provide a text string for a speech signal input to a device, the server comprising:
    a communication interface comprising communication circuitry;
    a storage storing a program including one or more instructions; and
    a processor configured to execute the one or more instructions of the program stored in the storage to:
    receive, from the device, an encoder output value derived from an encoder of an end-to-end automatic speech recognition (ASR) model included in the device; identify a domain corresponding to the received encoder output value; select a decoder corresponding to the identified domain from among a plurality of decoders of an end-to-end ASR model included in the server; obtain a text string from the received encoder output value using the selected decoder; and provide the obtained text string to the device,
    wherein the encoder output value is derived by the device by encoding the speech signal input to the device.

12. The server of claim 11, wherein the processor is further configured to execute the one or more instructions to identify the domain based on at least one of the encoder output value or domain information received from the device.

13. The server of claim 11, wherein the plurality of decoders respectively correspond to a plurality of domains, and
    wherein the processor is further configured to execute the one or more instructions to select the decoder corresponding to the identified domain from among the plurality of decoders corresponding to the plurality of domains.

14. The server of claim 11, wherein the plurality of decoders comprises a plurality of decoders corresponding to a plurality of types of end-to-end ASR models,
    wherein the processor is further configured to execute the one or more instructions to receive an identification value of the encoder and select the decoder corresponding to the encoder included in the device based on the identification value of the encoder.

15. The server of claim 11, wherein the processor is further configured to execute the one or more instructions to determine whether to provide the encoder output value from the device to the server based on a confidence level of the encoder output value.

16. The server of claim 11, wherein the encoder includes a plurality of stacked long short-term memory (LSTM) layers, and the encoder output value is based on an LSTM layer selected from among the plurality of stacked LSTM layers.

17. The server of claim 16, wherein the encoder output value includes a hidden layer vector sequence output from the selected LSTM layer.

18. The server of claim 17, wherein the processor is further configured to execute the one or more instructions to obtain text from the encoder output value and to identify the domain related to the text.

19. The server of claim 11, wherein the processor is further configured to execute the one or more instructions to: determine whether to interpret the obtained text string using a natural language understanding (NLU) model of the server; and provide the text string to the device based on determining that the text string is not to be interpreted using the NLU model of the server.

20. The server of claim 19, wherein the processor is further configured to execute the one or more instructions to: input the text string to the NLU model of the server based on determining that the text string is to be interpreted using the NLU model of the server; and provide the device with a voice assistant service based on data output from the NLU model of the server.

\* \* \* \* \*